(12) United States Patent
Dixon, III et al.

(10) Patent No.: US 6,697,785 B2
(45) Date of Patent: *Feb. 24, 2004

(54) SYSTEM, METHOD AND APPARATUS FOR COUPON PROCESSING AND BOOKLET

(76) Inventors: Merritt W. Dixon, III, 35 Modena Island Dr., Savannah, GA (US) 31411; James B. McCreary, 1 Strawberry Hill Ave., Unit 7F, Stamford, CT (US) 06902

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/314,583

(22) Filed: May 18, 1999

(65) Prior Publication Data

US 2001/0037236 A1 Nov. 1, 2001

Related U.S. Application Data

(60) Provisional application No. 60/086,045, filed on May 19, 1998.

(51) Int. Cl.[7] ............................................... G06F 17/60
(52) U.S. Cl. .............................. 705/14; 705/16; 705/21; 705/26; 704/270; 704/275
(58) Field of Search ............................. 705/14; 235/375

(56) References Cited

U.S. PATENT DOCUMENTS

| | | | |
|---|---|---|---|
| 4,166,540 A | * | 9/1979 | Marshall ..................... 209/555 |
| 4,791,281 A | | 12/1988 | Johnsen et al. |
| 4,821,186 A | | 4/1989 | Munakata et al. |
| 4,937,742 A | * | 6/1990 | Marshall ..................... 364/401 |

(List continued on next page.)

FOREIGN PATENT DOCUMENTS

WO    WO 97/21185    * 12/1997    ............ G06K/7/10

OTHER PUBLICATIONS

Coupon Scanning Breaks New Ground, Progressive Grocer, May 1992.*
In a holding pattern, Progressive Grocer, Garry, Michael, May 1995.*
Ending the paper chase, Progressive Grocer, Garry, Michael, May 1992.*
Survey—FT IT: Machines now 'read' a million forms a year: An advanced handwriting recongnition system can process up to 20,000 competition entries a day: Financial Times Surveys Edition, p 08, Oct. 1996.*

*Primary Examiner*—Eric W. Stamber
*Assistant Examiner*—Yehdega Retta
(74) *Attorney, Agent, or Firm*—Frommer, Lawrence & Haug LLP; Dennis M. Smid; Matthew K. Ryan

(57) ABSTRACT

A coupon manager is provided including a front end, back end and a central processor for facilitating the processing and settlement of coupons. The coupons are received from customers at the front end which may include a cashier register. The cashier scans a bar code on the coupons and the scanned information may be supplied to the back end. The received coupons are delivered to the back end for imaging and processing. The back end determines whether the coupons are valid. Valid coupons are destroyed and sent to a destruction bin, and invalid coupons may be sent to one of a number of other bins. The processed information is forwarded to the central processor which collates the information from a number of stores and reports the information to manufacturers for settlement. The present invention also provides a booklet having a listing of discounted items identifiable by a single bar code. The items may be arranged by types of goods or manufacturers and/or in alphabetical order so as to facilitate the use thereof by a customer. The booklet may be useable by itself or with coupon manager.

58 Claims, 30 Drawing Sheets

U.S. PATENT DOCUMENTS

| | | |
|---|---|---|
| 5,008,519 A | 4/1991 | Cunningham et al. |
| 5,128,520 A * | 7/1992 | Rando et al. ............... 235/375 |
| 5,185,695 A | 2/1993 | Pruchnicki |
| 5,200,889 A | 4/1993 | Mori |
| 5,208,445 A | 5/1993 | Nahar et al. |
| 5,308,118 A | 5/1994 | Ovadia |
| 5,353,218 A | 10/1994 | De Lapa et al. |
| RE34,915 E | 4/1995 | Nichtberger et al. |
| 5,420,606 A | 5/1995 | Begum et al. |
| 5,468,021 A | 11/1995 | Ovadia |
| 5,471,669 A | 11/1995 | Lidman |
| 5,581,064 A | 12/1996 | Riley et al. |
| 5,612,527 A | 3/1997 | Ovadia |
| 5,668,897 A * | 9/1997 | Stolfo ........................ 382/283 |
| 5,710,886 A * | 1/1998 | Christensen et al. ........ 395/214 |
| 5,844,221 A * | 12/1998 | Madigan, Jr. et al. ...... 235/375 |
| 6,035,280 A * | 3/2000 | Christensen ................. 705/14 |

* cited by examiner

WE'RE GIVING AWAY MONEY!

GET CashBack® MONTHLY

OR SAVE FOR CHRISTMAS, VACATION, TUITION... OR WHATEVER YOUR HEART DESIRES WITH A CashBack® SAVINGS ACCOUNT!

SHOP WHEREVER YOU SEE THE

 LOGO & SAVE!

616     614

APPLIANCES - KITCHEN

| | CREDIT REC'D |
|---|---|
| Citrus Juicer | $3.50 |
| Coffee Grinder | $2.50 |
| Coffeemaker, 4-cup | $3.50 |
| Coffeemaker, Flavorseled 12-cup | $8.00 |
| Water Filtering Pitcher | $2.50 |
| Blender, 5-speed | $10.00 |
| Hand Mixer, 5-speed | $6.50 |
| Stand Mixer | $20.00 |
| Toaster, 2-slice | $10.00 |

608

APPLIANCES - MAJOR & HOUSEHOLD

| | |
|---|---|
| Gas Grill, 24,000 BTU | $7.50 |
| Gas Grill, 44,000 BTU w/Deluxe Side Burner | $15.00 |
| Broom, Sprint Stick | $3.50 |
| Vacuum, Upright with Onboard Tools | $10.00 |
| Vacuum, Self-propelled Power Drive Upright | $20.00 |
| Dishwasher, | $20.00 |
| Dryer, 4-cycle Super Capacity Heavy-duty Electric | $30.00 |
| Refrigerator, 18.8 Cu. Ft. | $50.00 |
| Refrigerator, 16.7 Cu.Ft. | $50.00 |
| Washer, 7-cycle Heavy-duty | $30.00 |
| Sewing Machine, | |
| 23-stitch Auto-tension | $20.00 |
| 25-stitch Free-arm | $15.00 |
| Universal Sewing Case | $2.00 |

612

APPLIANCES - PERSONAL CARE

| | CREDIT REC'D |
|---|---|
| Plaque Remover w/Timer | $9.00 |
| Ultra | $10.00 |
| Corded Shaver | $6.00 |
| Rechargeable Beard/Mustache Trimmer | $5.00 |
| Lady's Rechargeable Wet/Dry Shaver | $10.00 |
| Hair Dryer, 1625-watt Full-size Eurostyle | $2.00 |
| Electric Rollers | $4.00 |

CAMERAS & FILM

CAMERAS

| | |
|---|---|
| 35-70mm Lens and Strap | $35.00 |
| Action Zoom | $15.00 |
| Flash Attachment | $5.00 |
| | $30.00 |
| | $40.00 |

FILM

| | |
|---|---|
| 7-pack 200 Speed | $5.00 |

CLOTHING

| | |
|---|---|
| Men's Slacks, Wrinkle-free Pleated Twill | $3.00 |
| Men's Briefs, 3-pack | $1.50 |
| JEANS | |
| Girls 7-12 | $2.00 |
| Misses or Petites, Relaxed Fit 5-Pocket | $3.00 |
| Boys' Windsuits | $2.00 |
| Girls' Windsuits | $2.00 |
| Infant/Toddler Windsuits | $1.50 |

COOKWARE

| | |
|---|---|
| French White | |
| 2-qt. Round Covered Casserole | $1.75 |
| 2.5-qt. Oval Covered Casserole | $2.00 |
| Just White | |
| 1-qt. Covered Casserole | $1.25 |
| 2-qt. Covered Casserole | $1.75 |
| 3-qt. Covered Casserole | $2.00 |
| Casual Elegance | |
| 10-pc. Set | $6.00 |
| Visions | |
| 1-qt. Versapot | $1.75 |
| 1.5-qt. Covered Saucepan | $2.00 |

FIG. 6B

|  |  |  |  |
|---|---|---|---|
| 622 | 620 626 ELECTRONICS | CREDIT REC'D | |
| | Home Theater Mini System | $55.00 | |
| | Portable CD Player | $25.00 | |
| | Cordless Phone, 900 MHz Digital w/Spread Spectrum | $20.00 | |
| | Kitchen Phone, 15' Cord and Deluxe Speakerphone | $5.00 | |
| | Telephone Answering Machine, 25-channel, Cordless | $10.00 | |
| | Game | $5.50 | |
| | Game Console | $10.00 | |
| | Camcorder, 8mm | $30.00 | |
| | TV, 9" | $30.00 | |
| | TV, 27" Stereo | $50.00 | |
| | TV/VCR, 19" Color | $45.00 | |
| | VCR, 4-head with VCR Plus + | $15.00 | |
| | VCR, 4-head Hi-Fi Stereo with VCR Plus + Cable Box Control | $20.00 | |

FOOTWEAR - ATHLETIC

MEN'S
- $6.50
- $6.00
- $6.00

WOMEN'S
- $6.00
- $5.50
- $5.50

FOOTWEAR - BOOTS

MEN'S
- $9.00
- $6.00

MFR WOMEN'S — CREDIT REC'D
- $10.00
- $10.00

FOOTWEAR - DRESS

MFR MEN'S
- Slip-On — $6.00
- Wingtip — $6.50
- $6.50

FURNITURE

MFR
- Action Lane® Hi-leg Recliner — $20.00
- Action Lane® Chaise Rocker — $35.00

MFR
- Entertainment Center, Deluxe Oak or Cherry — $20.00
- Entertainment Center, Pedestal Black or Oak — $15.00
- Multimedia Computer Workcenter — $10.00

MFR
Posturepedic
- Twin, each piece — $15.00
- Full, each piece — $20.00
- Queen Set — $50.00
- King Set — $75.00

Stylehouse Deluxe
- Full, each piece — $10.00
- Queen Set — $30.00
- King Set — $40.00

JEWELRY & WATCHES
- $3.75
- Water Resistant — $4.00
- Triathlon Indiglo — $5.50

OUTERWEAR

MFR WOMEN'S
- Black Lambskin Peacoat — $20.00

MFR WOMEN'S
- Long Wool Coats — $15.00

MFR MEN'S
- Down Parka — $20.00
- Towne by Classic Twill Raincoat — $10.00

MFR CHILDREN'S
- Boys' Parkas — $8.00
- Girls' Dress Coats — $10.00

FIG. 6C

GROCERIES 618 624

APPLESAUCE

| | CREDIT REC'D |
|---|---|
| MFR | |
| Cinnamon, 48 oz. | .50 |
| Natural, 46 oz. | .50 |
| Red Delicious, 24 oz. | .50 |
| Regular, 48 oz. | .50 |
| MFR | |
| Chunky Homestyle, 48 oz. | .50 |

BAKING PRODUCTS

| | |
|---|---|
| Reduced Fat, 40 oz. | .50 |
| Regular, 40 oz. | .50 |
| Butter Shortbread Crust 9", 6 oz. | .50 |
| Graham Cracker Crust 9", 6 oz. | .50 |
| Six Single Serve, 4 oz. | .50 |

BOXED DINNERS

| | |
|---|---|
| Angel Hair w/Parmesan Sauce, 5.1 oz. | .50 |
| Fettuccini w/Alfredo Sauce, 4.7 oz. | .50 |
| Rigatoni w/Tomato Basil Sauce, 4.4 oz. | .50 |

CEREAL

| | |
|---|---|
| Double Dip Crunch, 14.8 oz. | .50 |
| 11.25 oz. | .50 |
| Honey Nut, 16 oz. | .50 |
| Original, 13.5 oz. | .50 |

CHEESE

| | |
|---|---|
| Healthy Favorites Shrd. Cheddar 8 oz. | .50 |
| Healthy Favorites Shrd. Mozz. 8 oz. | .50 |
| American Fat Free Singles, 12 oz. | .50 |
| Soft, 8 oz. tub | .50 |

CLEANING PRODUCTS

| | |
|---|---|
| Clip Ons Refill, Outdoor Fresh, 1 ct. | .50 |
| Lasting Mist, Country Garden, 1 ct. | .50 |
| Plug-ins Refills, Country Spice, 3 ct. | .50 |
| Bath Cleaner, 16 oz. | .50 |

COFFEES/CREAMERS/TEAS

| | |
|---|---|
| VACUUM BAG | |
| Flake Electric Perk, 11.5 OZ. | .50 |
| Lite, 16 oz. or 20 oz. | .50 |
| Regular, 10 oz. or 20 oz. | .50 |
| Decaf Tea Bags, 24 ct. | .50 |

DENTAL CARE PRODUCTS

| | |
|---|---|
| 40 ct. or 52 ct. | .50 |

DEODORANTS

| | |
|---|---|
| Solid Aloe, 1.75 oz. | .50 |
| Solid Baby, 1.75 oz. | .50 |
| Solid Regular, 1.75 oz. | .50 |

DESSERTS

| | |
|---|---|
| Cinnamon Crisp, 13 oz. | .50 |
| Honey Nut Grahams, 14 oz. | .50 |
| Pecan Sandies, 16 oz. | .50 |
| Cookies, 16 oz. | .50 |
| Cherry, 14 oz. | .50 |
| Orange, 14 oz. | .50 |
| Strawberry, 14 oz. | .50 |
| Cookies, 20 oz. | .50 |

DISHWASHING PRODUCTS

| | |
|---|---|
| Lemon Automatic Dishwashing Detergent, 8.5 oz. | .50 |

FABRIC SOFTENERS

| | |
|---|---|
| Sheets, 18 ct. | .50 |
| Ultra Liquid, 1 oz. | .50 |
| Liquid Refill, 20 oz. carton | .50 |

FEMININE PRODUCTS

| | |
|---|---|
| Longs Deodorant, 18 ct. | .50 |
| Unscented, 22 ct. | .50 |

FROZEN FOODS - DINNER/ENTREES

| | |
|---|---|
| Broccoli Cheddar Cheese, 10.25 oz. | .50 |
| Chicken Fettuccini, 10.25 oz. | .50 |
| Teriyaki Stir Fry, 9 oz., 25 oz. | .50 |

FIG. 6D

|  | CREDIT REC'D |
|---|---|
| Lasagna, 9 oz. | .50 |
| Macaroni & Cheese, 76 oz. | .50 |
| Beef Fajita Kit, 23 oz. | 1.00 |
| Beef Stir Fry Kit, 30 oz. | 1.00 |
| Chicken Fajita Kit, 24 oz. | 1.00 |
| Chicken Stir Fry Kit, 26 oz. | 1.00 |
| Chicken & Rice Kit, 30 oz. | 1.00 |

FROZEN FOODS - VEGETABLES

| Cut Green Beans, 32 oz. | .50 |
|---|---|
| Golden Cut Corn, 32 oz. | .50 |

HAIR CARE PRODUCTS

| Dark Brown/Black, 1 application | .50 |
|---|---|
| Jet Black, 1 application | .50 |
| Mustache Beard Dark Brown, 1 oz. | .50 |
| Mustache Beard Jet Black, 1 oz. | .50 |
| Daily Beauty Shampoo, 15 oz. | .50 |
| Daily Conditioner, 15 oz. | .50 |
| Designing Spray, 8 oz. | .50 |
| Hold & Shine Spritz, 8 oz. | .50 |
| Moisture Rich Shampoo, 15 oz. | .50 |
| Volumizing Shampoo, 15 oz. | .50 |

HEALTH CARE PRODUCTS

| Mints, 75 ct. | .50 |
|---|---|
| Original, 12 ct., 24 ct. or 36 ct. | .50 |
| Tablets, 15 ct., 24 ct. or 36 ct. | .50 |
| Non Drowsy Formula, 10 ct. | .50 |
| Tablets, 10 ct. | .50 |

JUICES

| Cherry Brick Pack, 8.45 oz. | .50 |
|---|---|
| Orange Brick Pack, 8.45 oz. | .50 |
| Punch Brick Pack, 8.45 oz. | .50 |
| Apple Fun Size, 4.23 oz. | .50 |
| Berry Fun Size, 4.23 oz. | .50 |
| Grape Fun Size, 4.23 oz. | .50 |

LAUNDRY DETERGENTS

| Liquid Detergent 128 oz. | .50 |
|---|---|
| Liquid Detergent w/Bleach, 128 oz. | .50 |

|  | CREDIT REC'D |
|---|---|
| Powder Detergent, 32 oz. | .50 |
| Powder Detergent w/Bleach, 32 oz. | .50 |

MAYONNAISE

| Mayonnaise, 32 oz. | .50 |
|---|---|

MEATS - CANNED

| Beef Stew, 24 oz. | .50 |
|---|---|
| Select Prime Catch Tuna/Water, 3 oz. | .50 |
| Solid White Tuna in Water, 3 oz. | .50 |

MEATS - PACKAGED

| 16 oz. | .50 |
|---|---|
| Red Hots, 16 oz. | .50 |
| Smokies, 16 oz. | .50 |
| Stak Pak Bologna, 16 oz. | .50 |

MIXES/MARINADES

| Meatloaf Mix, 3.35 oz. | .50 |
|---|---|
| Steak Sauce Mix, .9 oz. | .50 |
| Meat Marinade, 8 oz. | .50 |
| Seafood Scampi Marinade, 1 oz. | .50 |
| Teriyaki Liquid Marinade, 8 oz. | .50 |

PAPER PRODUCTS

| Boutique Colors, 95 ct. | .50 |
|---|---|
| Boutique Prints, 95 ct. | .50 |
| Ultra Upright, 70 ct. | .50 |

PASTA

| Angel Hair, 16 oz. | .50 |
|---|---|
| Fettuccini, 12 oz. | .50 |
| Linguine, 16 oz. | .50 |
| Dumplings, 12 oz. | .50 |
| Extra Broad Noodles, 12 oz. | .50 |
| Fine Noodles, 12 oz. | .50 |

PET FOODS

| Bacon Strips, 3 or 4 oz. | .50 |
|---|---|
| Beef Strips, 1 oz. | .50 |
| Beef Strips, 6 oz. | .50 |

FIG. 6E

|  | CREDIT REC'D |
|---|---|
| Beef, 3 or 4 oz. | .50 |
| MEATY BONES | |
| Small, 18 oz. | .50 |
| Medium, 18 oz. | .50 |
| Large, 18 oz. | .50 |
| Value Pack, 60 oz. | .50 |
| Flavor Treats, 13 oz. | .50 |
| Biscuit, 48 oz. | .50 |
| PICKLES/RELISH | |
| MARIO | |
| Manzanilla Spanish Olives, 10 oz. | .50 |
| Medium Pitted Olives, 6 oz. | .50 |
| MT. OLIVE | |
| Bread & Butter Chips, 16 oz. | .50 |
| Dill Pickles, 8 oz. | .50 |
| Hamburger Dill Chips, 12 oz. | .50 |
| Hot Chow Chow, 16 oz. | .50 |
| India Relish | .50 |
| Polish Kosher Dills, 32 oz. | .50 |
| Sour Pickles, 16 oz. | .50 |
| Sweet Sandwich Chips, 12 oz. | .50 |
| PINEAPPLE | |
| DOLE PINEAPPLE | |
| Chunks, 20 oz. | .25 |
| Crushed, 20 oz. | .25 |
| Sliced, 20 oz. | .25 |
| POPCORN | |
| POP SECRET | |
| Butter, 6 pack, 21 oz. | .50 |
| Butter Light, 6 pack, 18 oz. | .50 |
| POP WEAVER | |
| Microwave Butter, 6 pack | .50 |
| Microwave Butter Lt., 6 pack | .50 |
| PIZZA QUICK SAUCES | |
| RAGU PIZZA QUICK SAUCE | |
| Pepperoni, 14 oz. | .50 |
| Traditional, 14 oz. | .50 |
| RICE | |
| UNCLE BEN'S | |
| Poly Bag Rice, 5 lb. | .50 |
| MINUTE RICE | |
| Boil 'n Bag, 14 oz. | .50 |
| SEAFOOD | |
| LOUIS KEMP | |
| Imitation Crab, Bulk, 10 lb. | .50 |
| Imitation Lobster, Bulk, 10 lb. | .50 |

|  | CREDIT REC'D |
|---|---|
| SHOE CARE PRODUCTS | |
| KIWI BRANDS | |
| Liquid Black, 2.5 oz. | .50 |
| Paste Black, 1.125 oz. | .50 |
| Shoe White, 2.5 oz. | .50 |
| Sneaker Shampoo, 2.5 oz. | .50 |
| Scuff Magic, Black, 2.5 oz. | .50 |
| Wet Puff, 2.5 oz. | .50 |
| SKIN CARE PRODUCTS | |
| LUBRIDERM | |
| Seriously Sensitive, 6 oz. | .50 |
| Unscented, 6 oz. | .50 |
| SNACK FOODS | |
| KEEBLER | |
| Reduced Fat Chips Deluxe | .50 |
| Reduced Fat Toasted Wheat | .50 |
| SOAP | |
| CASHMERE BOUQUET | |
| 3 pack | .50 |
| DIAL | |
| For Kids, 4 pack, 3 oz. bar | .50 |
| Moisturizing Plus, 2 pack, 4.5 oz. | .50 |
| OCTAGON | |
| Laundry Bar Soap | .50 |
| SOFT SOAP | |
| Antibacterial Refill, 15 oz. | .50 |
| Kitchen Soap Refill, Lemon, 15 oz. | .50 |
| Moisturizing Pump, 7.5 oz. | .50 |
| SOFT DRINKS | |
| Multi Pack Bottles, 16 oz. | .50 |
| SPRITE | |
| 2 liter bottle | .50 |
| 12 pack, 12 oz. cans | .50 |

GROCERIES

| | INSTANT SAVINGS |
|---|---|
| APPLESAUCE | |
| Cinnamon, 48 oz. | .50 |
| Natural, 46 oz. | .50 |
| Red Delicious, 24 oz. | .50 |
| Regular, 48 oz. | .50 |
| Homestyle, 48 oz. | .50 |
| BAKING PRODUCTS | |
| Reduced Fat, 40 oz. | .50 |
| Regular, 40 oz. | .50 |
| All-Purpose Baking Mix Orig. 20 oz. | .50 |
| Pancake Mix Shake'N Pour Blueberry | .50 |
| Pancake Mix Shake'N Pour Buttermilk | .50 |
| Pancake Mix Shake' N Pour Original | .50 |
| BOXED DINNERS | |
| Angel Hair w/Parmesan Sauce, 5.1 oz. | .50 |
| Fettuccini w/Alfredo Sauce, 4.7 oz. | .50 |
| Rigatoni w/Tomato Basil Sauce, 4.4 oz. | .50 |
| CEREAL | |
| Double Dip Crunch, 14.8 oz. | .50 |
| 20 oz. | .50 |
| Healthy Choice Almond Crunch, 14 oz. | .50 |
| 15 oz. | .50 |
| 19 oz. | .50 |
| CHEESE | |
| Healthy Favorites Shrd. Cheddar 8 oz. | .50 |
| Healthy Favorites Shrd. Mozz. 8 oz. | .50 |
| American Fat Free Singles. 12 oz. | .50 |
| Soft, 8-oz-tub | .50 |
| CLEANING PRODUCTS | |
| Clip Ons Refill, Outdoor Fresh, 1 ct. | .50 |
| Lasting Mist, Country Garden, 1 ct. | .50 |
| Plug-Ins Refills, Country Spice, 3 ct. | .50 |
| Bath Cleaner, 16 oz. | .50 |
| COFFEES/CREAMERS/TEAS | |
| VACUUM BAG | |
| Flake Electric Perk, 11.5 OZ. | .50 |
| Flake Automatic Drip, 11.5 oz. | .50 |

732

| | INSTANT SAVINGS |
|---|---|
| Lasagna, 9 oz. | .50 |
| Macaroni & Cheese, 76 oz. | .50 |
| Beef Fajita Kit, 23 oz. | 1.00 |
| Beef Stir Fry Kit, 30 oz. | 1.00 |
| Chicken Fajita Kit, 24 oz. | 1.00 |
| Chicken Stir Fry Kit, 26 oz. | 1.00 |
| Chicken & Rice Kit, 30 oz. | 1.00 |
| FROZEN FOODS - VEGETABLES | |
| PICKSWEET | |
| Cut Green Beans, 32 oz. | .50 |
| Golden Cut Corn, 32 oz. | .50 |
| HAIR CARE PRODUCTS | |
| Pro-V Shampoo Plus Conditioner, 2 oz. | .50 |
| Pro-V Hair Spray Extra Hold, 10.2 oz. | .50 |
| Pro-V Styling Mousse Extra Hold, 8 oz. | .50 |
| Pro-V Spray On Gel Extra Hold, 8.5 oz. | .50 |
| Spray-On Gel, 8.5 oz. | .50 |
| Conditioner, 1 ltr. | .50 |
| Styling Mousse Extra Body, 8 oz. | .50 |
| Shampoo, 1 ltr. | .50 |
| Shampoo Stylists Choice, 13 oz. | .50 |
| HEALTH CARE PRODUCTS | |
| Mints, 75 ct. | .50 |
| Original, 12 ct., 24 ct. or 36 ct. | .50 |
| Tablets, 15 ct., 24 ct. or 36 ct.   MFR | .50 |
| PM Pain Reliever, 100 caplets | .50 |
| Extra Strength Tablets, 50 ct. | |
| PM Aspirin Free Caplets, 100 ct. | .50 |
| Extra Strength Tablets, 100 ct. | .50 |
| JUICES | |
| Fruit Drink 6 pk. | .50 |
| Fruit Punch, 3-8.45 oz. | .50 |
| Lemonade, 1 gal. | .50 |
| Grape Juice Cocktail | .50 |
| Lemonade Frozen Concentrate | .50 |
| Lemonade Single Serve | .50 |
| LAUNDRY DETERGENTS | |
| Liquid Detergent 128 oz. | .50 |
| Liquid Detergent w/Bleach, 128 oz. | .50 |

FIG. 7C

|  | INSTANT SAVINGS |
|---|---|
| Powder Detergent, 32 oz. | .50 |
| Powder Detergent w/Bleach, 32 oz. | .50 |
| MAYONNAISE | |
| Mayonnaise, 32 oz. | .50 |
| Peanut Butter Creamy | .50 |
| MEATS - CANNED | |
| Beef Stew, 24 oz. | .50 |
| Select Prime Catch Tuna/Water, 3 oz. | .50 |
| Solid White Tuna in Water, 3 oz. | .50 |
| MEATS - PACKAGED | |
| 16 oz. | .50 |
| Smokies, 16 oz. | .50 |
| Stok Pak Bologna, 16 oz. | .50 |
| Beef Coto Salami, 8 oz. | .50 |
| Bacon, 1 lb. | .50 |
| MIXES/MARINADES | |
| Meatloaf Mix, 3.35 oz. | .50 |
| Steak Sauce Mix, .9 oz. | .50 |
| Meat Marinade, 8 oz.     MFR | .50 |
| Seafood Scampi Marinade, 1 oz. | .50 |
| Teriyaki Liquid Marinade, 8 oz. | .50 |
| PAPER PRODUCTS | |
| Boutique Colors, 95 ct. | .50 |
| Boutique Prints, 95 ct. | .50 |
| Ultra Upright, 70 ct. | .50 |
| PASTA | |
| Angel Hair, 16 oz. | .50 |
| Fettuccini, 12 oz. | .50 |
| Linguine, 16 oz. | .50 |
| Dumplings, 12 oz. | .50 |
| Extra Broad Noodles, 12 oz. | .50 |
| Fine Noodles, 12 oz. | .50 |
| PET FOODS | |
| Bacon Strips, 3 or 4 oz. | .50 |
| Beef Strips, 1 oz. | .50 |

|  | INSTANT SAVINGS |
|---|---|
| Small, 18 oz. | .50 |
| Medium, 18 oz. | .50 |
| Large, 18 oz. | .50 |
| Value Pack, 60 oz. | .50 |
| Flavor Treats, 13 oz. | .50 |
| Biscuit, 48 oz. | .50 |
| PICKLES/RELISH | |
| Manzanilla Spanish Olives, 10 oz. | .50 |
| Medium Pitted Olives, 6 oz. | .50 |
| Bread & Butter Chips, 16 oz. | .50 |
| Dill Pickles, 8 oz. | .50 |
| Hamburger Dill Chips, 12 oz. | .50 |
| Hot Chow How, 16 oz. | .50 |
| India Relish | .50 |
| Polish Kosher Dills, 32 oz. | .50 |
| Sour Pickles, 16 oz. | .50 |
| Sweet Sandwich Chips, 12 oz. | .50 |
| Chunks, 20 oz. | .25 |
| Crushed, 20 Oz. | .25 |
| Sliced, 20 oz. | .25 |
| POPCORN | |
| Microwave / Butter 3-3 oz. | .50 |
| Original 45 oz. | .50 |
| Smart Pop Low Fat, 3-3oz. | .50 |
| Redenbudders Microwave, Butter, 3-3 oz. | .50 |
| PIZZA QUICK SAUCES | |
| Pepperoni, 14 oz. | .50 |
| Traditional, 14 oz. | .50 |
| RICE | |
| Poly Bag Rice, 5 lb. | .50 |
| Brown Rice Natural Whole Grain Original 16 oz. | .50 |
| SEAFOOD | |
| Imitation Crab, Bulk, 10 lb. | .50 |
| Imitation Lobster, Bulk, 10 lb. | .50 |

FIG. 7D

| SHOE CARE PRODUCTS | INSTANT SAVINGS |
|---|---|
| Liquid Black, 2.5 oz. | .50 |
| Paste Black, 1.125 oz. | .50 |
| Shoe White, 2.5 oz. | .50 |
| Sneaker Shampoo, 2.5 oz. | .50 |
| Scuff Magic, Black, 2.5 oz. | .50 |
| Wet Puff, 2.5 oz. | .50 |
| SKIN CARE PRODUCTS | |
| Seriously Sensitive, 6 oz | .50 |
| Unscented, 6 oz. | .50 |
| SNACK FOODS | |
| Reduced Fat Chips Deluxe | .50 |
| Reduced Fat Toasted Wheat | .50 |
| SOAP | |
| 3 pack | .50 |
| For Kids, 4 pack, 3 oz. bar | .50 |
| Moisturizing Plus, 2 pack, 4.5 oz. | .50 |
| Laundry Bar Soap | .50 |
| Antibacterial Refill, 15 oz. | .50 |
| Kitchen Soap Refill, Lemon, 15 oz. | .50 |
| Moisturizing Pump, 7.5 oz. | .50 |
| SOFT DRINKS | |
| Multi Pack Bottles, 16 oz. | .50 |
| 2 liter bottle | .50 |
| 12 pack, 12 oz. cans | .50 |

| APPLIANCES - PERSONAL CARE /728 | INSTANT SAVINGS |
|---|---|
| Plaque Remover w/Timer | $9.00 |
| Ultra | $10.00 |
| Corded Shaver | $6.00 |
| Rechargeable Beard/Mustache Trimmer | $5.00 |
| Lady's Rechargeable Wet/Dry Shaver | $10.00 |
| Hair Dryer, 1625-watt Full-size Eurostyle | $2.00 |
| Smart Setter Electric Rollers | $4.00 |
| CAMERAS & FILM —730 | |
| 35-70mm Lens and Strap | $35.00 |
| Action Zoom | $15.00 |
| 2000XI Flash Attachment | $5.00 |
| 5 | $30.00 |
| 40 | $40.00 |
| 7-pack 200 Speed | $5.00 |
| CLOTHING | |
| Men's Slacks, Wrinkle-free Pleated Twill. | $3.00 |
| Men's Briefs, 3-pack | $1.50 |
| JEANS | |
| Girls 7-12 | $2.00 |
| Misses or Petites, Relaxed Fit 5-Pocket | $3.00 |
| Boys' Windsuits | $2.00 |
| Girls' Windsuits | $2.00 |
| Infant/Toddler Windsuits | $1.50 |
| COOKWARE | |
| French White | |
| 2-qt. Round Covered Casserole | $1.75 |
| 2.5-qt. Oval Covered Casserole | $2.00 |
| Just White | |
| 1-qt. Covered Casserole | $1.25 |
| 2-qt. Covered Casserole | $1.75 |
| 3-qt. Covered Casserole | $2.00 |
| Casual Elegance | |
| 10-pc. Set | $6.00 |
| Visions | |
| 1-qt. Versapot | $1.75 |
| 1.5-qt. Covered Saucepan | $2.00 |

FIG. 7E

|  | MFR | INSTANT SAVINGS |
|---|---|---|
| WOMEN'S | | |
| Rinaldi | | $10.00 |
| Ventura | | $10.00 |

FOOTWEAR - DRESS

| MEN'S | |
|---|---|
| Cambridge Captoe | $6.00 |
| Cambridge Slip-On | $6.50 |
| Cambridge Wingtip | $6.50 |

FURNITURE

| Action Lane® Hi-leg Recliner | $20.00 |
|---|---|
| Action Lane® Chaise Rocker | $35.00 |
| Entertainment Center, Deluxe Oak or Cherry | $20.00 |
| Entertainment Center, Pedestal Black or Oak | $15.00 |
| Multimedia Computer Workcenter | $10.00 |

Posturepedic Classic 700
| Twin, each piece | $15.00 |
|---|---|
| Full, each piece | $20.00 |
| Queen Set | $50.00 |
| King Set | $75.00 |

Stylehouse Deluxe
| Full, each piece | $10.00 |
|---|---|
| Queen Set | $30.00 |
| King Set | $40.00 |

JEWELRY & WATCHES

| 100 | $3.75 |
|---|---|
| Water Resistant | $4.00 |
| Triathlon Indiglo | $5.50 |

OUTERWEAR

| WOMEN'S | |
|---|---|
| Black Lambskin Peacoat | $20.00 |

| WOMEN'S | |
|---|---|
| JNY Long Wool Coats | $15.00 |

| MEN'S | |
|---|---|
| Down Parkas | $20.00 |
| Towne by London Fog Classic Twill Raincoat | $10.00 |

| CHILDREN'S | |
|---|---|
| Boys' Parkas | $8.00 |
| Girls' Dress Coats | $10.00 |

| APPLIANCES - KITCHEN | INSTANT CREDIT |
|---|---|
| Citrus Juicer | $3.50 |
| Coffee Grinder | $2.50 |
| Coffeemaker, 4-cup | $3.50 |
| Coffeemaker, Flavorselect 12-cup | $8.00 |
| Water Filtering Pitcher | $2.50 |
| Blender, 5-speed | $10.00 |
| Hand Mixer, 5-speed | $6.50 |
| Stand Mixer | $20.00 |
| Toaster, 2-slice | $10.00 |

APPLIANCES - MAJOR & HOUSEHOLD

| Gas Grill, 24,000 BTU | $7.50 |
|---|---|
| Gas Grill, 44,000 BTU w/Deluxe Side Burner | $15.00 |
| Broom, Sprint Stick | $3.50 |
| Vacuum, Spirit™ Upright with Onboard Tools | $10.00 |
| Vacuum, Self-propelled Power Drive Upright | $20.00 |
| Dishwasher, PotScrubber™ | $20.00 |
| Dryer, 4-cycle Super Capacity Heavy-duty Electric | $30.00 |
| Refrigerator, 18.8 Cu. Ft. | $50.00 |
| Refrigerator, 16.7 Cu.Ft. | $50.00 |
| Washer, 7-cycle Heavy-duty | $30.00 |
| Sewing Machine, | |
| 23-stitch Auto-tension | $20.00 |
| 25-stitch Free-arm | $15.00 |
| Universal Sewing Case | $2.00 |

EACH TIME YOU USE YOUR

LIST

YOU INCREASE YOUR CHANCE TO WIN A YEAR'S WORTH OF GROCERIES AND UP TO $100,000 IN CASH

FIG. 7F

SYSTEM, METHOD AND APPARATUS FOR COUPON PROCESSING AND BOOKLET

BACKGROUND OF THE INVENTION

This application is based on the copending provisional application (U.S. Ser. No. 60/086,045) filed May 19, 1998 which is incorporated herein by reference.

The present invention relates to a system, method and apparatus for processing coupons and more particularly to a system, method and apparatus for facilitating the verification and settlement of coupons. The present invention relates to a booklet and a system therefor for processing information relating to discounts of items listed therein.

Coupons are used by a large number of people to obtain discounts on a variety of products, such as food items. Such coupons may be presented to a retailer by a customer at the time of sale. The retailer may send the coupons to a clearinghouse which is operated by a clearinghouse corporation where valid coupons are identified. The valid coupons are sent to the manufacturer who redeems the retailer for the discount.

Retailers are typically short-changed by accepting coupons. To explain, retailers essentially lose money on each discounted item and count on being redeemed. Unfortunately, the clearinghouse all too often mishandles the coupons which leaves the retailers unreimbursed. When it is considered that retailers accept volumes of coupons each week, it will be immediately recognized that lost income due to coupon-mishandling costs the retail industry huge sums each year.

Manufacturers often lose money when, for example, the cashier or the store submits more coupons than entitled. Sometimes this is done intentionally in order to defraud the manufacturer. Worse, by the time the manufacturer discovers the fraud the culprit has long absconded.

Consumers find coupons to be more hassle than their worth. Detached or detachable coupons are unkempt and clutters one's pockets or pocket book. Moreover, coupons are unorganized and it is difficult to find the desired coupon when needed such as when checking out. The disorganized nature of coupons also makes it difficult to keep track of valid coupons such as coupons which have not expired.

What is needed is a system which facilitates the verification and settlement of coupons.

OBJECTS AND SUMMARY OF THE INVENTION

An object of the present invention is to provide a technique which facilitates processing of coupons for a plurality of stores.

Another object of the present invention is to provide a coupon manager system operable for use with a plurality of stores and having a central processor and a number of front ends and a back end apparatus for each store.

Another object of the present invention is to provide a coupon manager system as aforesaid wherein the central processor provides an information useable for auditing purposes.

Another object of the present invention is to provide a booklet having a plurality of items with information identifiable with a single bar code.

Another object of the present invention is to provide a system for processing the booklet.

In accordance with the foregoing objects, there is provided a coupon manager system for processing coupons in a predetermined manner. The predetermined manner in at least one embodiment determines a redemption value of the coupons. In one aspect of the present invention, the coupon manager system includes a front end cash register at the point of sale, a back end for processing the coupons received and a central processing computer for receiving and collating the processed coupon information. The central processing computer may collate the coupon information from a plurality of retail stores and send reports to manufacturers. The central processing computer may function as an auditing system which maintains account balances of redemption values owed and paid.

The back end which may be operated independently as an apparatus includes in at least one embodiment an image scanner for imaging the coupons. A central processing unit determines the validity of the coupons based on matching coupons with transactions and/or manufacturers. In one aspect of the present invention, the back end apparatus destroys the valid coupons. The back end apparatus may include one or more bins for receiving the processed coupons including a destruction bin for receiving the destroyed coupons, a non-participating bin for receiving coupons of manufacturers not participating in the coupon manager service, an exception bin for receiving coupons of an anomalous nature such as coupons which cannot be assigned to a transaction or manufacturer and a future bin reserved for future applications.

A booklet of the present invention includes front and back covers and pages. A listing is provided which lists the product discounts. A single bar code is provided for a plurality of items to be discounted. In at least one embodiment, the listing of the booklet is an index or a table-of-contents. The index may be organized according to any number of categories including the type of product, price and manufacturer. The booklet may be color coded for ease of access. In addition, the booklet may include additional information such as coupon advertisements, sweepstakes or cash prizes. The booklet may include any type of coupon, rebate or other form of redemption including a credit which is credited to a credit account. The booklet may be incorporated in an integrated system or utilized independent of the coupon manager system such as in a non-integrated system.

Other objects, features and advantages according to the present invention will become apparent from the following detailed description of the illustrated embodiments when read in conjunction with the accompanying drawings in which corresponding components are identified by the same reference numerals.

BRIEF DESCRIPTION OF THE DRAWINGS

FIGS. 6A–6F illustrate an example of the booklet of the present invention; and

FIGS. 7A–7G illustrate an example of the booklet of the present invention.

DETAILED DESCRIPTION OF THE PREFERRED EMBODIMENTS

Figure 1:
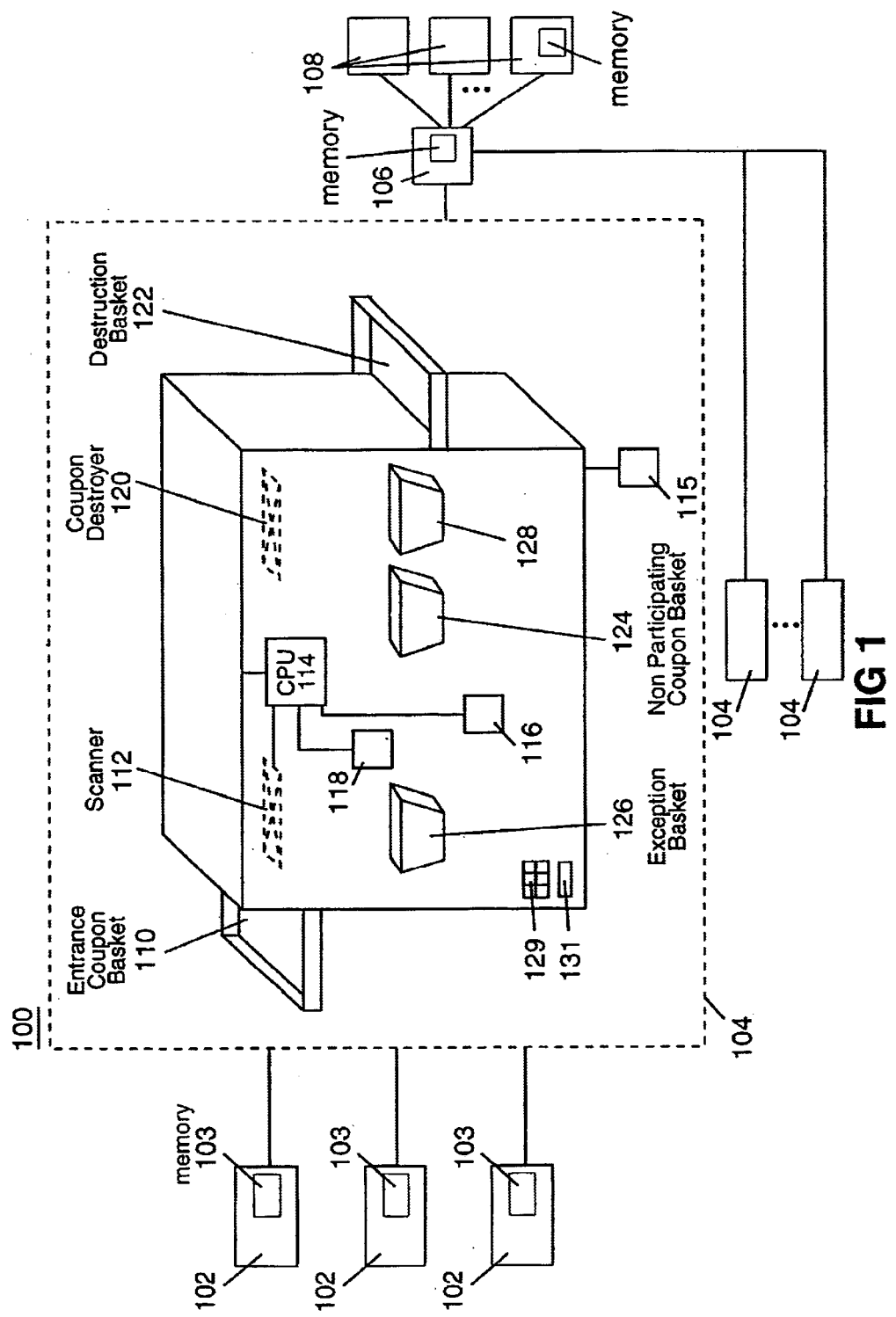
FIG. 1 is a diagram of the coupon manager system according to an embodiment of the present invention.

The coupon manager system 100 shown in FIG. 1 includes a front end 102, a back end 104 and a central processor 106 for processing coupons. The front end 102 receives coupons in exchange for goods purchased at a discount. The back end apparatus 104 processes the coupons in a predetermined manner. The central processor 106 receives the processing information relating to the coupons from a number of back end units located at a number of stores. The central processor 106 collates the information and forwards the same either electronically or otherwise to the appropriate manufacturer(s) 108. Thus, the present invention advantageously replaces the clearinghouse with a coupon manager system which facilitates the verification and settlement of coupons.

The front end 102 may be situated at the point of sale of a retail store which comprises a number of cash registers each operated by a cashier. Each cash register may include a bar code reader 103 such as an in-lane scanner which uses an optical system such as a laser for reading bar codes which may be located on the coupons. The bar code scanner may scan universal product codes, coupon prefixes (5 or 99), company codes, family codes, value codes and/or check digit codes. The cashier operates the bar code scanner by scanning the bar code on the coupon. The transaction is electronically recorded by the cash register and forwarded thereby to the back end apparatus 104. Data of the bar code may be forwarded to the back end apparatus. In addition, the cashier may enter an override on a keypad which inputs transactional information of a discount relating to a coupon which cannot be read by the bar code scanner. Other information such as the cashier identification which identifies the cashier may be entered at the cash register and forwarded to the back end apparatus for processing with the coupons.

The back end apparatus 104 receives the coupons at an input 110 which may be a hopper or receptacle for receiving the coupons. The hopper may shuffle the coupons by mechanical, vibration or air operation by the use of air jets, suction cups and so forth to a scanner 112.

The scanner 112 which may be controlled by the central processing unit 114 (CPU) scans each coupon received from the input 110 so as to obtain an image of one or both sides of the coupon. In at least one embodiment, the scanner obtains an image by, for example, use of photo-optics. The scanner 112 may be a grey scale scanner which encodes the colors of the coupon using either shades of grey or numerical codes. The scanner 112 is preferably a digital type scanner which obtains digital signals. Alternatively, an analog type scanner may be utilized. In at least one embodiment, the central processing unit 114 digitally pre-processes the digital image of the coupon by removing imperfections therefrom by use of imaging techniques. Such digital processing may significantly improve the accuracy of detecting the bar code as compared to the in-lane reader. It will be immediately appreciated that the improved accuracy advantageously reduces the number of coupons erroneously rejected due to a misreading of the coupon.

All or a portion of the digital image of the coupon may be stored in a memory 116 of the back-end apparatus 104. The central processing unit 114 may store in the memory 116 or any other suitable recording medium the coupon images for a predetermined amount of time such as 90 or 180 days for purposes of maintaining a record of the image. Advantageously, manufacturers will appreciate that the image records provide a paperless confirmation of the redemption process which may be used as an integrity check to reassure the manufacturer.

A coupon may have a universal product code (UPC) or an expanded bar code. The universal product code (UPC) may be sufficient for identifying products and prices or discounts. However, the UPC may provide little, if any, additional information some of which may be useful as marketing data. On the other hand, the expanded bar code may provide information for identifying the product and its price or discount and may also provide additional information such as a company code, a family code, a value code, a check digit code and other information useful as marketing data. Until now, retailers and manufacturers were content with UPC mainly because the UPC is the universally-accepted standard. In addition, the excessive cost of specialized scanners which read expanded bar codes has dissuaded retailers. The digitization of the bar code image as prescribed by the present invention allows the expanded bar code image to be analyzed digitally by the central processing unit 114 thereby obviating the need for specialized scanners.

The predetermined manner in which the central processing unit 114 processes the coupons may determine which coupons are redeemable by the manufacturer. In addition, or in the alternative, the predetermined manner processes the coupons to determine marketing information including, for example, information indicating the family or household from which the coupon is submitted or the name of the company or manufacturer. The information produced may be either a complete database of information or a summary of information relating to the coupons. The present invention may provide truncated information representing a subset of information such as a subset of stored images which is sent to the manufacturer as an integrity check representing the credibility of the summary information. The information produced may be coupled to the digital images of the coupons such that a combined database of information and related images is formed. The information may be printed by a local printer (not shown) or transferred either electronically or otherwise to the central processing system 106.

In determining which coupons are redeemable by the manufacturer, the central processing unit 114 validates each coupon. The central processing unit 114 may also determine whether the manufacturer is valid. Validity may be determined by matching the coupon as identified by the bar code to a transaction with reference to information stored, for example, in the memory 116 which may be preloaded from any suitable means including a recordable medium or downloaded automatically from sources such as the central processing system 106 or an on-line source such as the internet.

When the central processing unit 114 determines that a coupon is valid for redemption, the coupon is directed to a coupon destroyer 120 which destroys or physically alters the coupon to indicate that the coupon is not to be reused. The coupon destroyer 120 may destroy the coupons by spraying a liquid such as indelible ink or dye on the coupon, imparting a physical abrasion on the coupon or burning the coupon by directing a laser thereon. In at least one embodiment, the coupon is left substantially intact such that the coupon can later be identified after destruction for purposes of auditing. The coupon destroyer 120 may cut, shred or obliterate the coupon entirely. In addition, the coupon destroyer may be a spinning wheel(s) which may include a hub and spokes which perforate the coupon as the wheel(s) spins. The destroyed coupons are collected in a destruction bin or basket 122 whereby, in at least one embodiment, the destroyed coupons are arranged in an orderly manner and may be categorized according to product or manufacturer by means operated by the central processing unit 114. The destroyed coupons may be subsequently sent to the respective manufacturer with a report.

Coupons which are determined by the central processing unit 114 as originating from manufacturers who are not participants in the coupon manager system are directed to a non-participating coupon basket or bin 124. Coupons which have expired according to an expiration date may also be sent by the central processing unit 114 to the non-participating coupon basket 124. When the central processing unit 114 identifies an anomaly in processing a particular coupon, the anomalous coupon is directed to an exception basket or bin 126. The CPU 114 determines an anomaly, for example, when the number of coupons as counted by a counter 118 does not match the number of transactions for the coupons. A future applications basket or bin 128 is provided which is reserved for future applications such as for receiving those coupons which cannot be read either by the scanner 112 or the central processing unit 114.

The central processing unit 114 may detect local coupons which are redeemed by the retailer or a local company other than the manufacturer and directs the local coupons to, for example, the non-participating coupon basket 124. Hard to handle coupons such as "buy-one get-one-free up to a predetermined price" are directed by the central processing unit 114 to, for example, the future application's basket 128.

A keypad 129 may be provided for entering information such as the identification number of the operator or cashier. A display 131 may be provided for displaying the operations or information relating to the result of processing by the back end apparatus 104.

The central processing unit 114 may arbitrarily assign coupons to transactions conducted at the front end 102. For example, "n" number of coupons as counted by counter 118 may be matched arbitrarily with "m" number of transactions. In this manner, the actual transaction for a particular coupon is not necessarily matched with the associated coupon. For example, when a cashier overrides a transaction, there may be less coupons than transactions. In addition, a local printer 115 may be provided which prints information relating to the processing of the back end apparatus 104.

It will be appreciated that the present invention prevents fraud by quickly and accurately determining the redemption value of coupons. In addition, the central processing unit 114 may run a series of fraud security programs on the coupons processed. Such programs may include tabulating unlikely mixes of coupons, unlikely redemption rates by the cashier or the store and comparisons of coupon cuts to look for gang cuts. Suspicious results may be noted on the manufacturer's report.

Coupon information processed by the back end apparatus 104 of a number of retail stores is forwarded to the central processing system 106. The information may be transferred to the central processing system 106 at predetermined intervals such as nightly. The central processing system 106 processes the received information which may involve collating the information in a predetermined manner such as by manufacturer or type of goods so as to generate a report. The central processing system 106 may generate reports including special enhanced reports, multiple reports and/or the digital images. The report may be broken out by retailer's store. The reports may be available over a secured internet access or the like. The reports may further include information such as time of redemption, information contained in the coupon bar code and/or information indicating the product purchased with the coupon. The reports may include a summary/detailed report of all items processed for settlement. The reports may also indicate why a coupon or coupons were not processed, such as for failure of having a bar code, only having a partial bar code, hand-written coupon, expired coupon and so forth. The report may indicate the total redemption value. In addition, or in the alternative, the report may break down the coupon redemption by categories of goods and may provide an analysis of the scanned image of the coupon. The report may include grand totals as well as sub-totals. The reports may be supplied to any desired party including the manufacturer, retailer or service corporation.

It is within the scope of the present invention to provide a system which maintains account balances between retailers, manufacturers and a service corporation which operates the present invention based on the information processed by the central processor 106. For example, the central processing system 106 may arrange to electronically transfer funds between the manufacturers and the retailers in response to the coupon information result.

The present system may process several different forms of coupons including, for example, individual coupons in the form of a two-sided slip of paper, coupons coupled together or flyers. The present system may process information on more than one side of the coupon such as the bar code on one side and family information on the other side.

Operations performed by the system of FIG. 1 will now be described with reference to FIGS. 2A and 2B. The purchase basket analysis and coupon manager II will be described with reference to FIG. 4C.

Figure 2A:
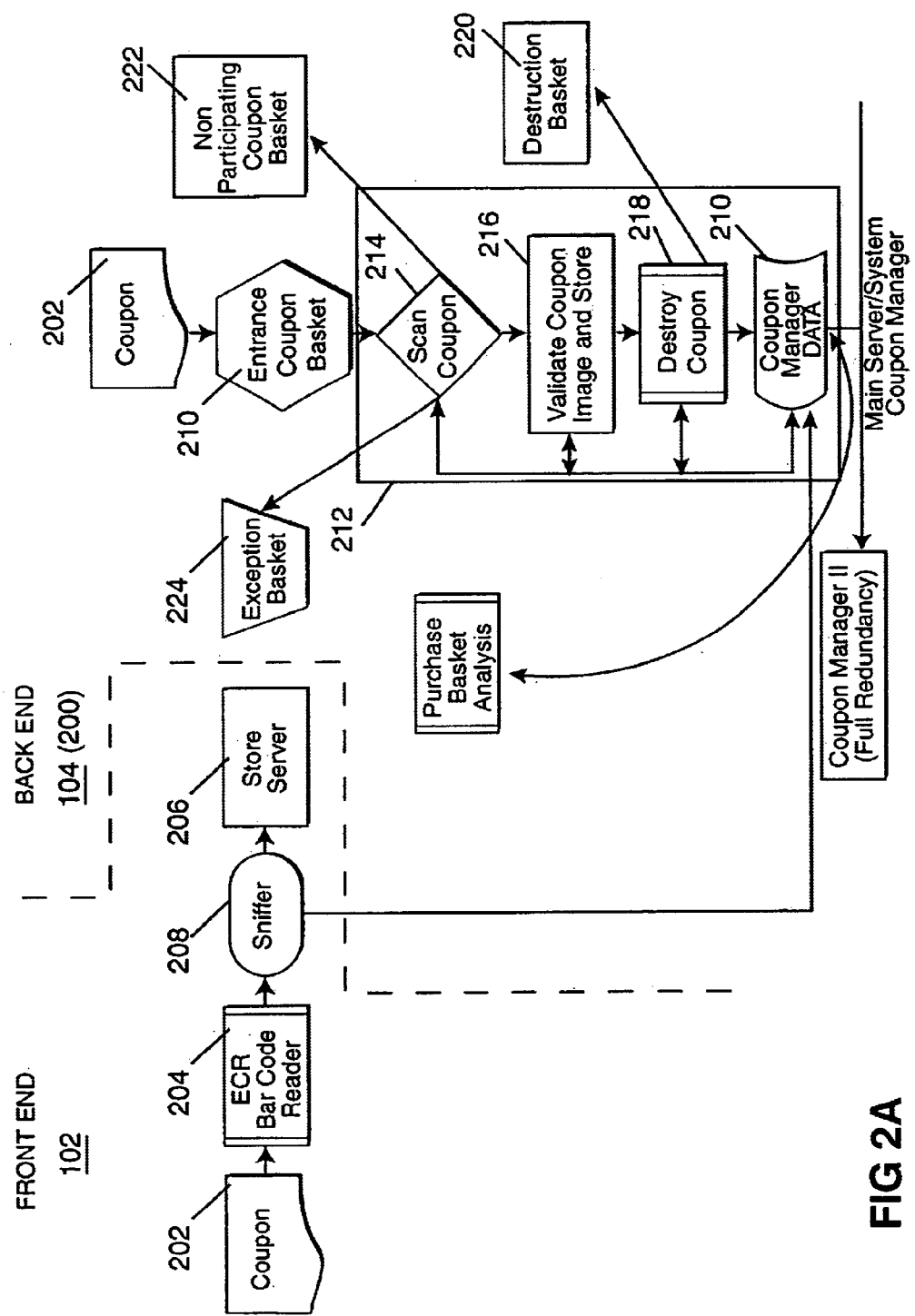
FIGS. 2A and B are diagrams to which reference will be made in explaining drawings of the coupon manager system of FIG. 1.

In FIG. 2A, coupons 202 are read by an ECR (Electronic Cashier Register) bar code reader 204 which may be coupled to a cash register in the front end 102. The information corresponding to the bar code of the coupon is transferred to store server 206. The store server 206 authorizes the discount transaction and forwards the discount amount to the cashier register.

The bar codes may be decoded using a sniffer 208 which may be a line tap between the cash register and the store server 206. Bar code information detected by the sniffer 208 is coupled to a buffer 210 of the back end apparatus 104 which stores the bar code information. In addition, the transactional information may be stored in the buffer 210.

The back end apparatus 104 receives the coupons 202 at input 210 (110) and processes the same. The processing is generally indicated by reference numeral 212 wherein the coupons are scanned at 214, validated at 216 and destroyed at 218. The coupons are determined as valid on the basis of the data in the buffer 210 (122). Destroyed coupons are directed to the destruction basket 220. It is also possible that the data of the valid coupon images are stored in the buffer 210. Coupons determined by the processing as being redeemable by non-participating manufacturers are directed to the non-participating coupon basket 222 (124). Coupons determined as anomalous such as coupons which have no transaction associated therewith are forwarded to the exception basket 224 (126).

Figure 2B:
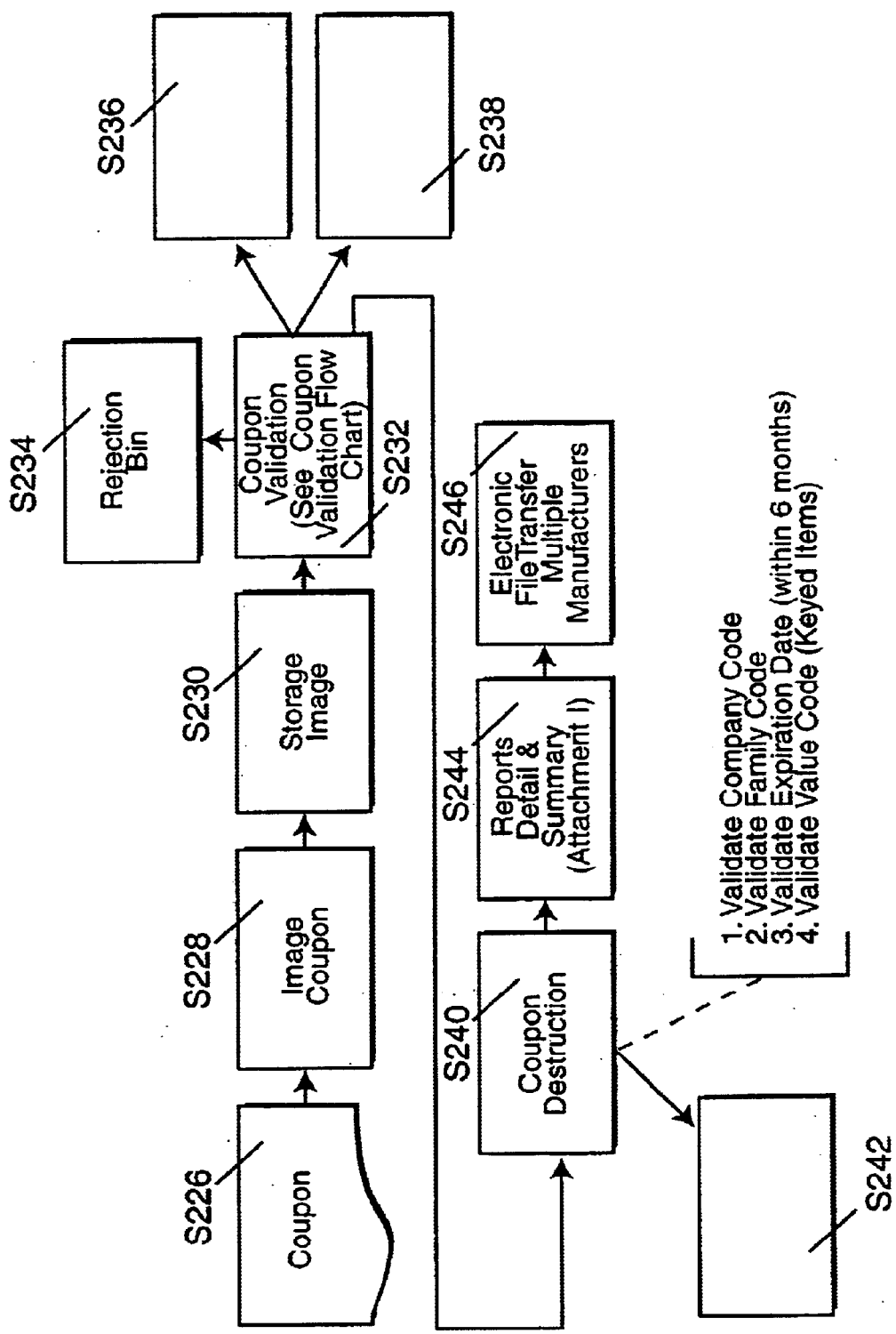

FIG. 2B shows the coupon and information flow which may be performed in the back-end 104. In step S226, the coupons are input. The coupons are imaged in step S228 and stored in step S230. Coupon validation is determined in step S232 and, if invalid, are directed to the exception bin in step S234. If the coupons are anomalous, they are forwarded to the non-participating bin in step S236. If the coupons originate from a non-participating manufacturer, they may be sent to the non-participating bin in step S238 which is reserved for future applications. The coupons may be validated in accordance with the company, family, value codes or the expiration date. Upon validation, the valid coupons are destroyed in step S240 and forwarded to the destruction bin in step S242. Reports are generated in detail and/or summary in step S244 based on the results of the processing in steps S232–240 and the reports may be electronically transferred to the manufacturer in step S246.

The processing of different types of coupons is explained with reference to FIGS. 3A–I. It will be appreciated that the present invention is not limited to the particular types of coupons illustrated and may include other types of coupons as well.

Figure 3A:
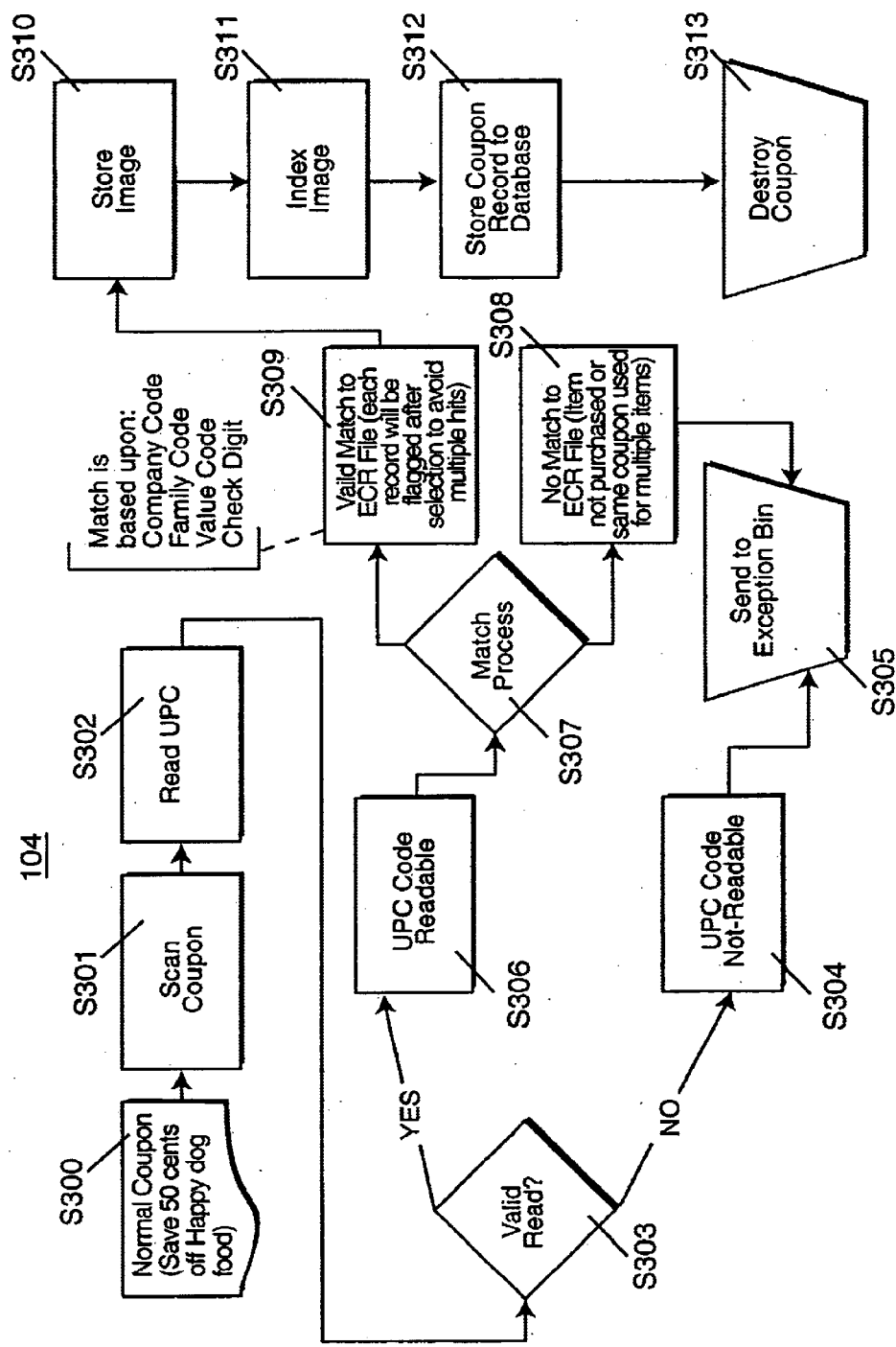
FIGS. 3A–3I are diagrams to which reference will be made in explaining drawings of the coupon manager system of FIG. 1.

FIG. 3A sets forth the processing steps for processing normal coupons. According to the present invention, normal coupons offer discounts to potential consumers for a product identified on the coupon as indicated by a bar code. In step S300, the normal coupon is identified. The normal coupon in step S301 is scanned and the UPC is read in step S302. In at least one embodiment, the scanning and reading is performed digitally. It is determined in step S303 whether the coupon has been validly read. When the coupon is not validly read, information representing this state is generated and stored by the processor 114 into memory 116 in step S304 and the coupon is forwarded to the exception bin in step S305. If the coupon is validly read, information is generated indicating that the coupon is readable in step S306.

In the matching process of step S307, the coupon is matched to a transaction at the point of sale. In at least one embodiment, the matching process matches the coupon to the corresponding transaction at the point of sale. In the alternative, the matching process arbitrarily assigns coupons to transactions based on the type of transaction rather than matching actual transactions with corresponding coupons. When no match is detected, information is generated and stored to the ECR file in step S308 and the coupon is forwarded to the exception bin in step S305. However, if a match is detected, processor generates and stores information indicating valid matches in the ECR file in step S309. In at least one embodiment, a record of the valid and/or invalid matches is maintained and checked in the matching process of step S307 to prevent the same coupon from being used for a multiple of items or times. In step S310, the scanned image of the validly-matched coupons are stored in memory 116 (FIG. 1). In step S311, the stored images are indexed for easy access. The coupon records are stored in a database in step S312 and the valid coupons are destroyed in step S313.

Figure 3B:
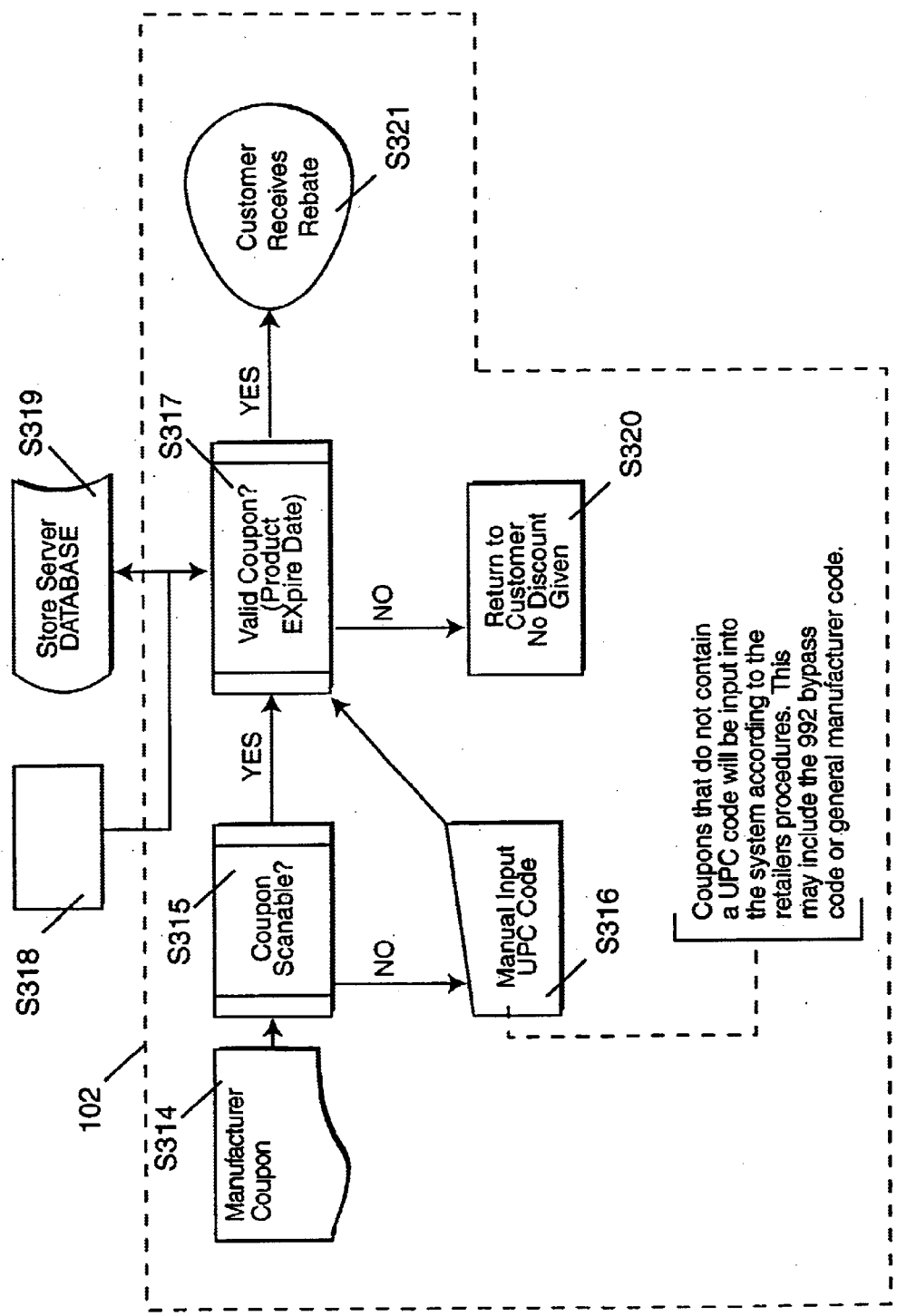

FIG. 3B sets forth the steps for processing "manufacturer" coupons. Manufacturer coupons are input at step S314 and scanned at step S315. If the coupon is not scannable, the code (such as a UPC code) is entered manually in step S316. In at least one embodiment, the manual input may include a so-called 992 bypass code or a general manufacturer code. In either case, processor control advances to step S317 where it is determined whether the coupon is valid based on validity information received from a device in step S318 or the buffer 210 (FIG. 2A) in step S319. Such validity information may include the product, the expiration date and/or the manufacturer. Invalid coupons are returned to the customer with no discount in step S320; whereas, if the coupon(s) is valid, customers receive the discount, credit or rebate in step S321.

Figure 3C:
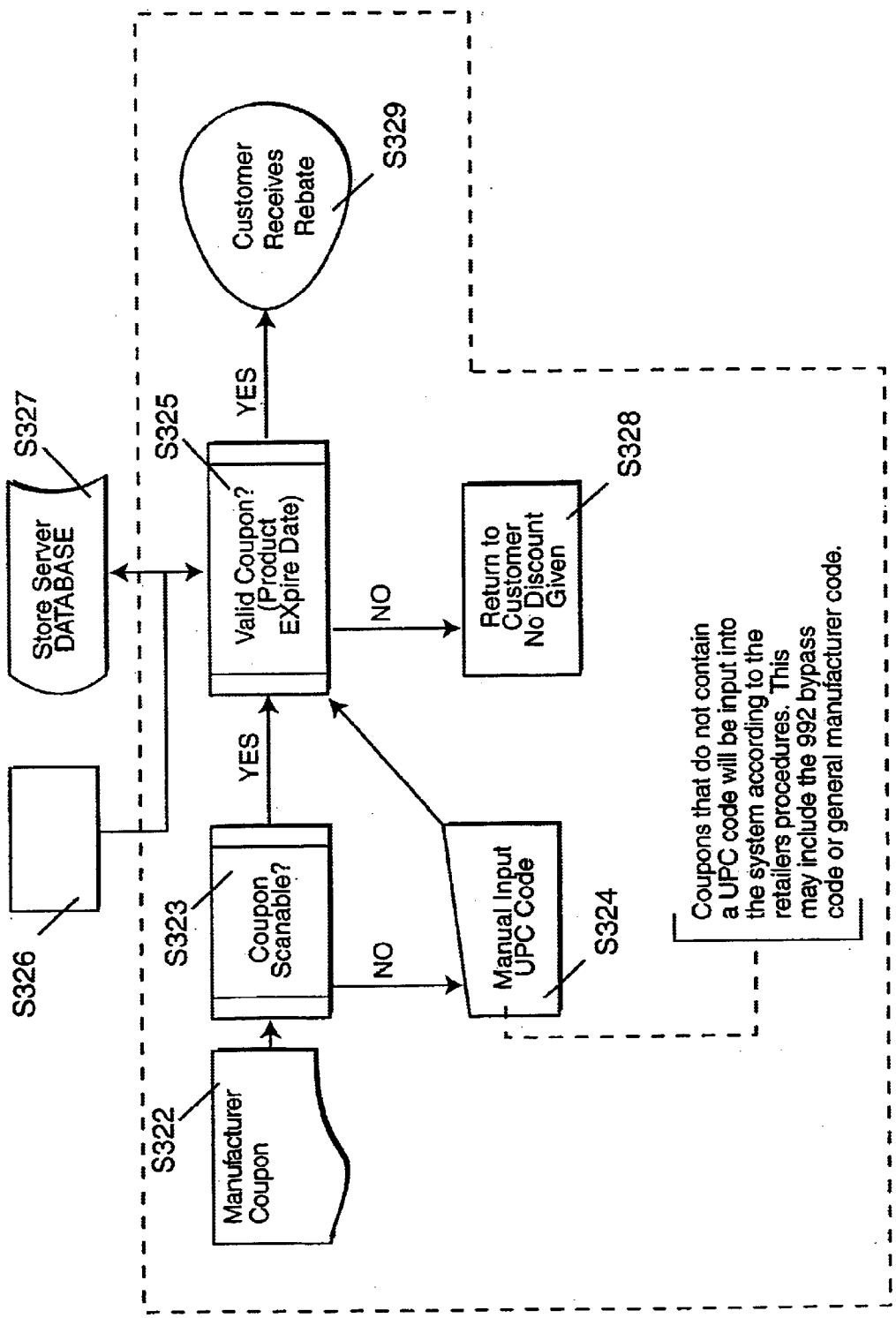

FIG. 3C sets forth the processing steps for processing "in-store" coupons. An in-store coupon is redeemed directly by the retailer or by a local entity such as a distributor in contrast with a national or regional coupon which is redeemed by a manufacturer. Heretofore, clearinghouses erroneously disposed of in-store coupons although directed to return such coupons to the retailer. The present invention advantageously processes in-store coupons. Steps S322–329 are similar to the steps in FIG. 3B except the processing in step S325 processes the in-store coupon.

Figure 3D:
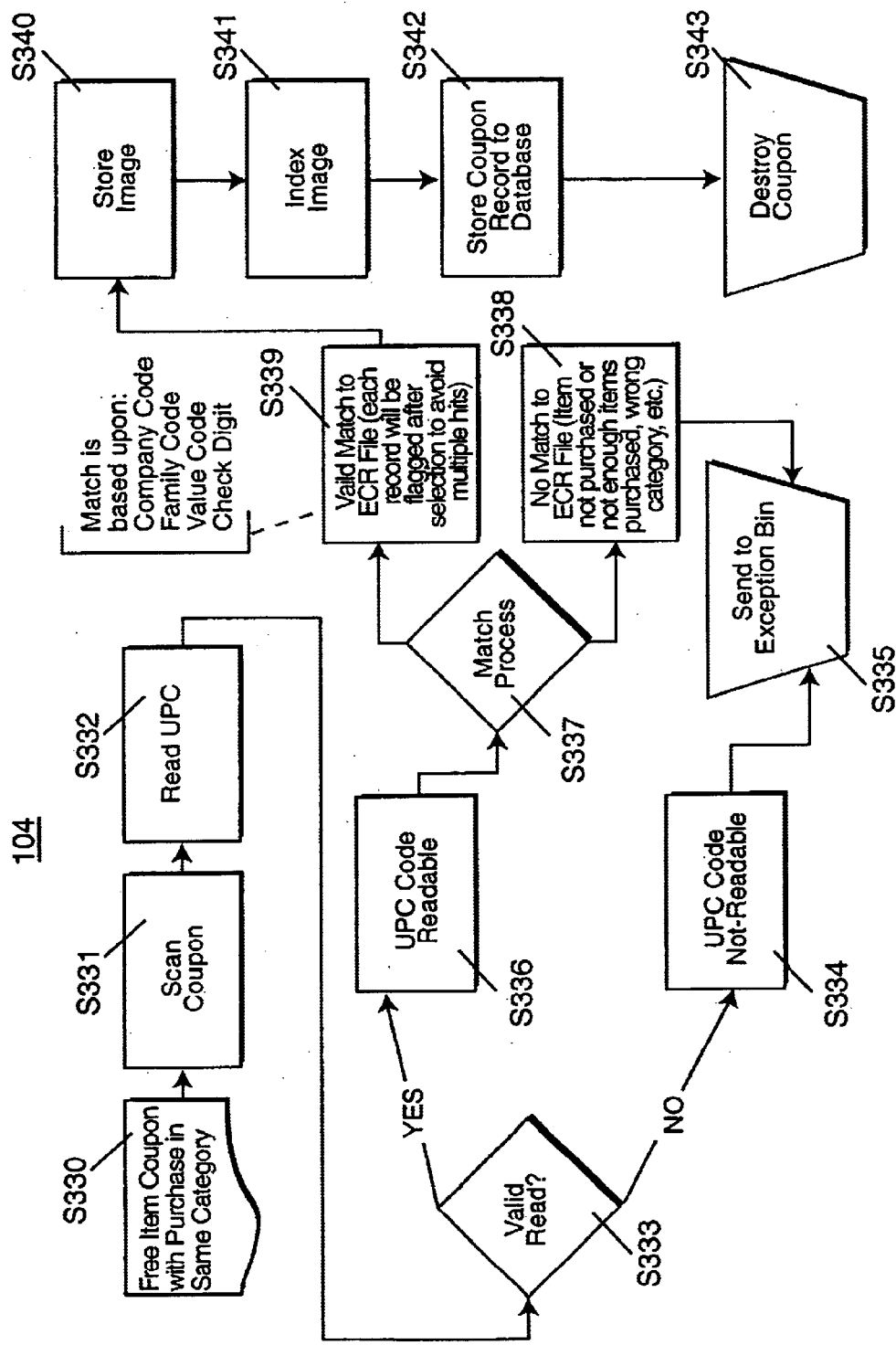

FIG. 3D illustrates the processing of "free-item with purchase in the same category" coupons (hereinafter "free-item coupons). The free-item coupon credits the consumer to receive a free item with the purchase of another item in the same category. The process is substantially the same as shown in FIG. 3A for processing a normal coupon except that the processing in step S337 stores the credit in memory 216 (FIG. 2A) to the customer for the category of the item purchased. This category may be, for example, food groups, appliances, electronics, clothes or other retail goods. The credit may be stored in a database temporarily in the buffer 210 (FIG. 2A), for example.

Figure 3E:
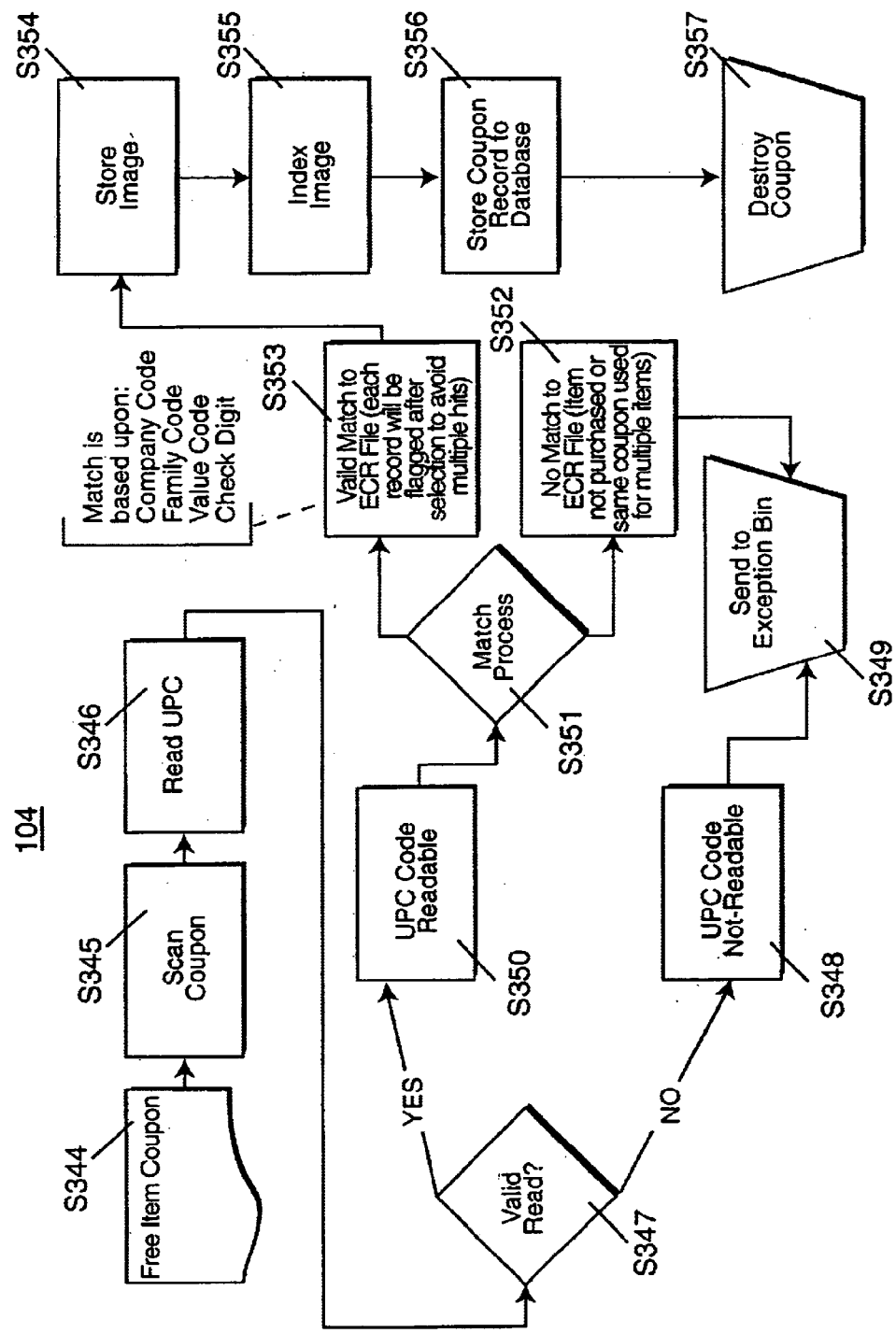

FIG. 3E shows the processing steps for processing a "free-item" coupon. The free-item coupon entitles the consumer to a free item. It will be appreciated that steps S344–S357 are similar to the steps shown in FIG. 3A for processing the normal coupon except that the processing in step S351 stores the credit of the free item to the customer.

Figure 3F:
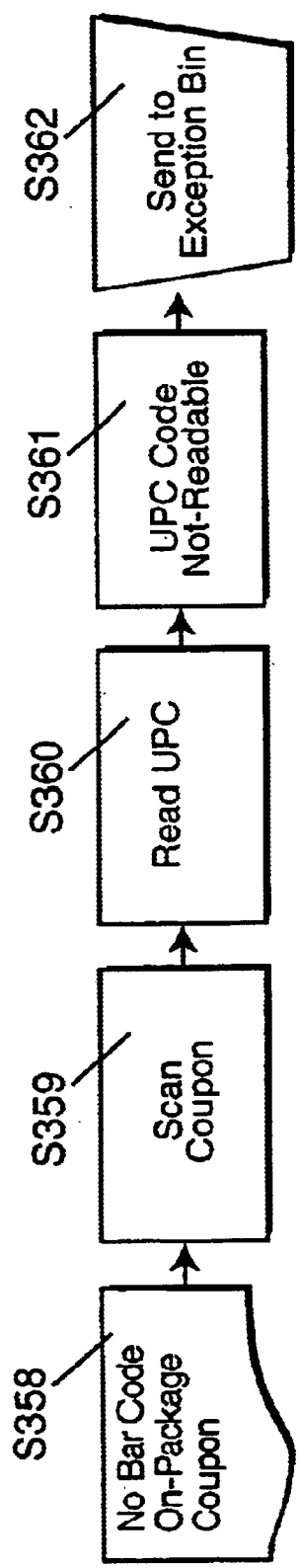

FIG. 3F sets forth the processing of coupons which have no bar code on the package. It will be appreciated that the processing steps S358–S362 are a subset of FIG. 3A wherein it is decided that the bar code is not readable in step S361 and the coupon is sent to the exception bin in step S362. In the present invention, the coupon may be accepted in any event by manual input as set forth in steps S316 and S324 of FIGS. 3B and 3C.

Figure 3G:
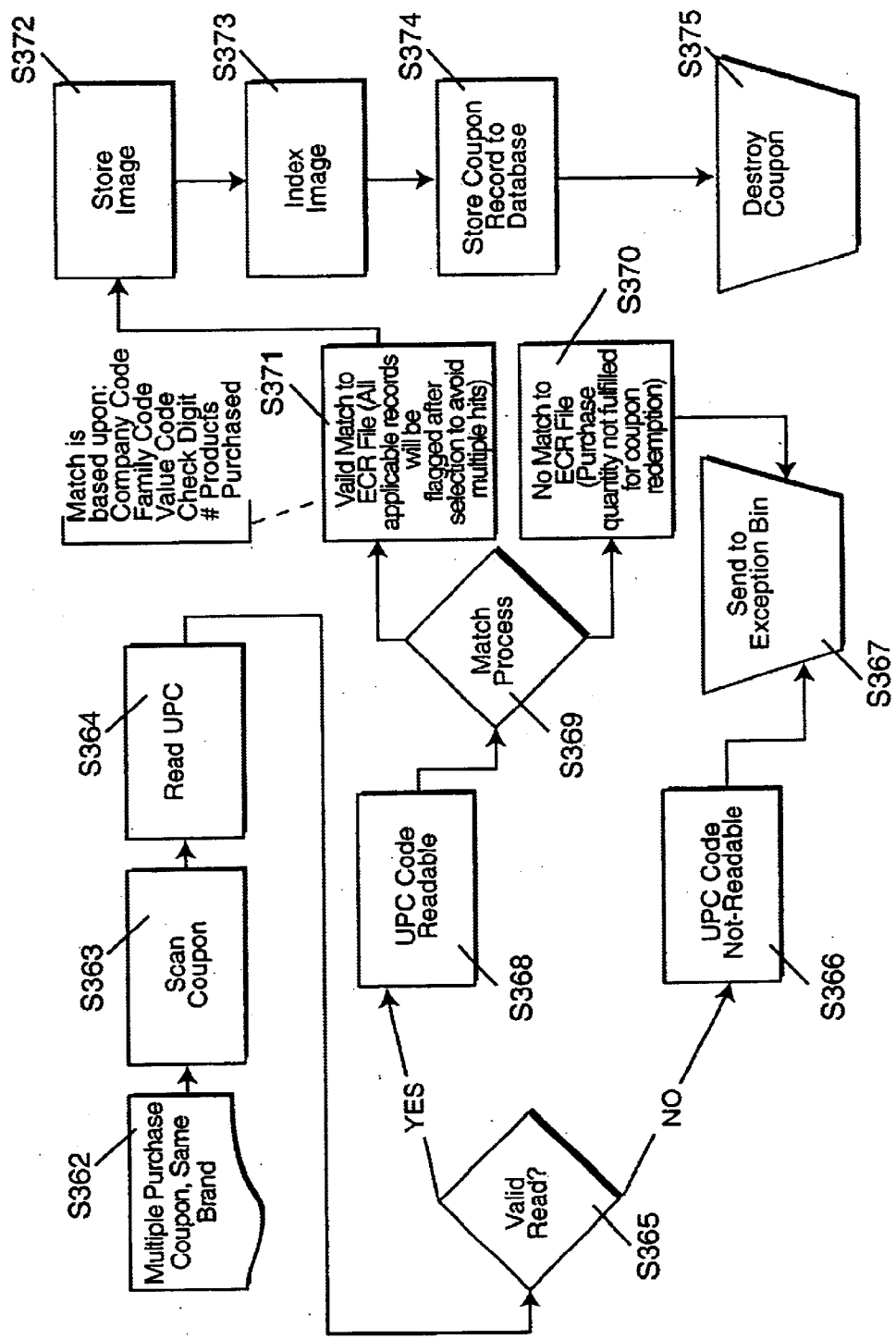

FIG. 3G sets forth the steps S362–S375 for processing "multiple purchase" coupons of the same brand. A multiple purchase coupon for the same brand entitles a consumer to apply the coupon a multiple of times to the same brand. Multiple purchase coupons may also be applied to other brands, manufacturers or categories. It will be appreciated that the processing steps are similar to the processing steps for a normal coupon as in FIG. 3A except that the processing in FIG. 3G stores the information crediting the number of times the coupon may be applied to any number of future transactions.

Figure 3H:
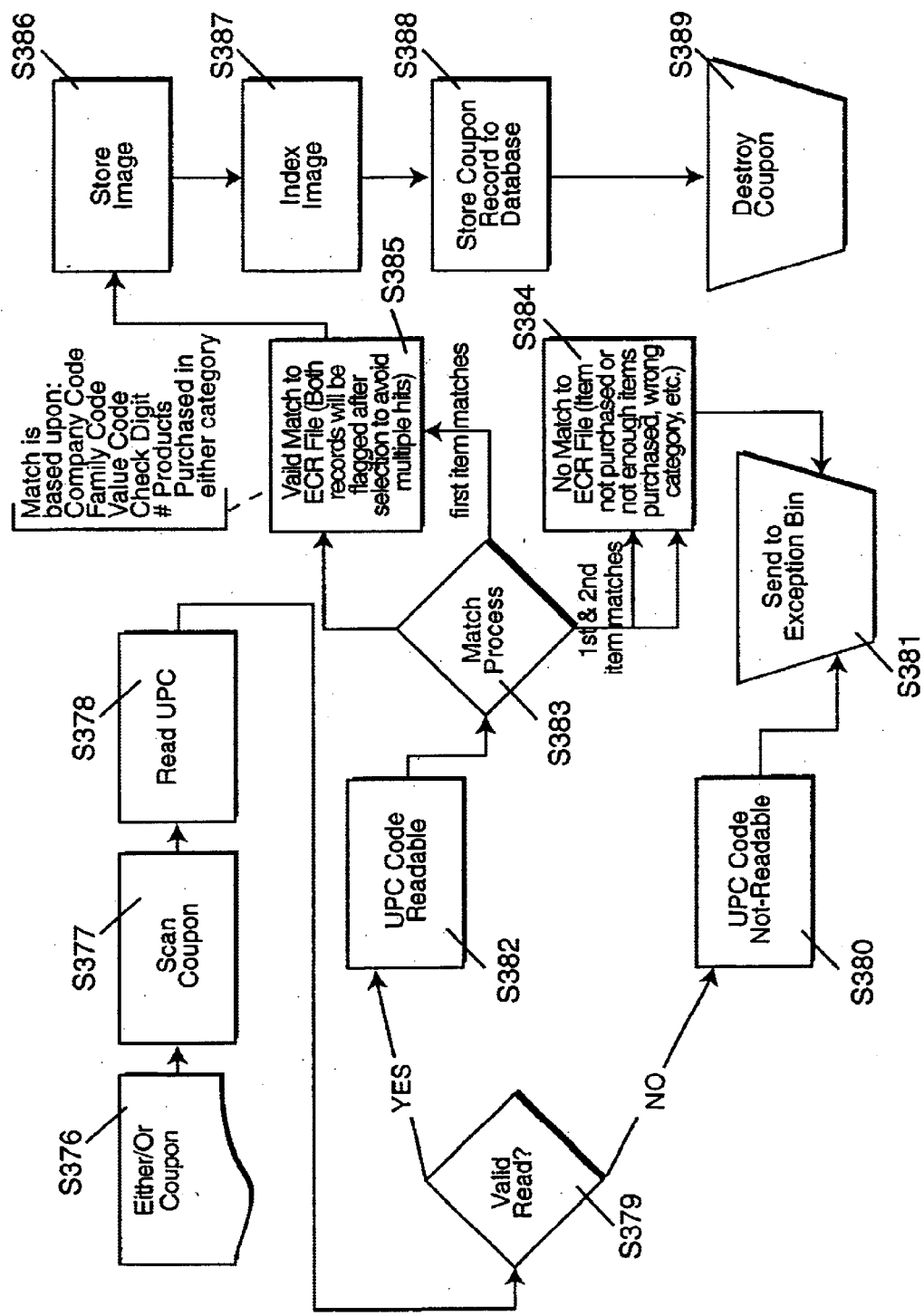

FIG. 3H sets forth the steps S376–S389 for processing "either/or" coupons which is similar to processing of the normal coupon in FIG. 3A. Either/Or coupons entitle the consumer to receive a discount for one or more of a plurality of goods. As illustrated in step S383, first and second items are matched separately to different transactions. If the first item matches a transaction, then processing proceeds to step S385 for the first item. Similarly, if the second item matches a transaction, then processing proceeds to step S385 for the second item. Otherwise, the processing proceeds to step S384 for either the first or second item which does not match a transaction.

Figure 3I:
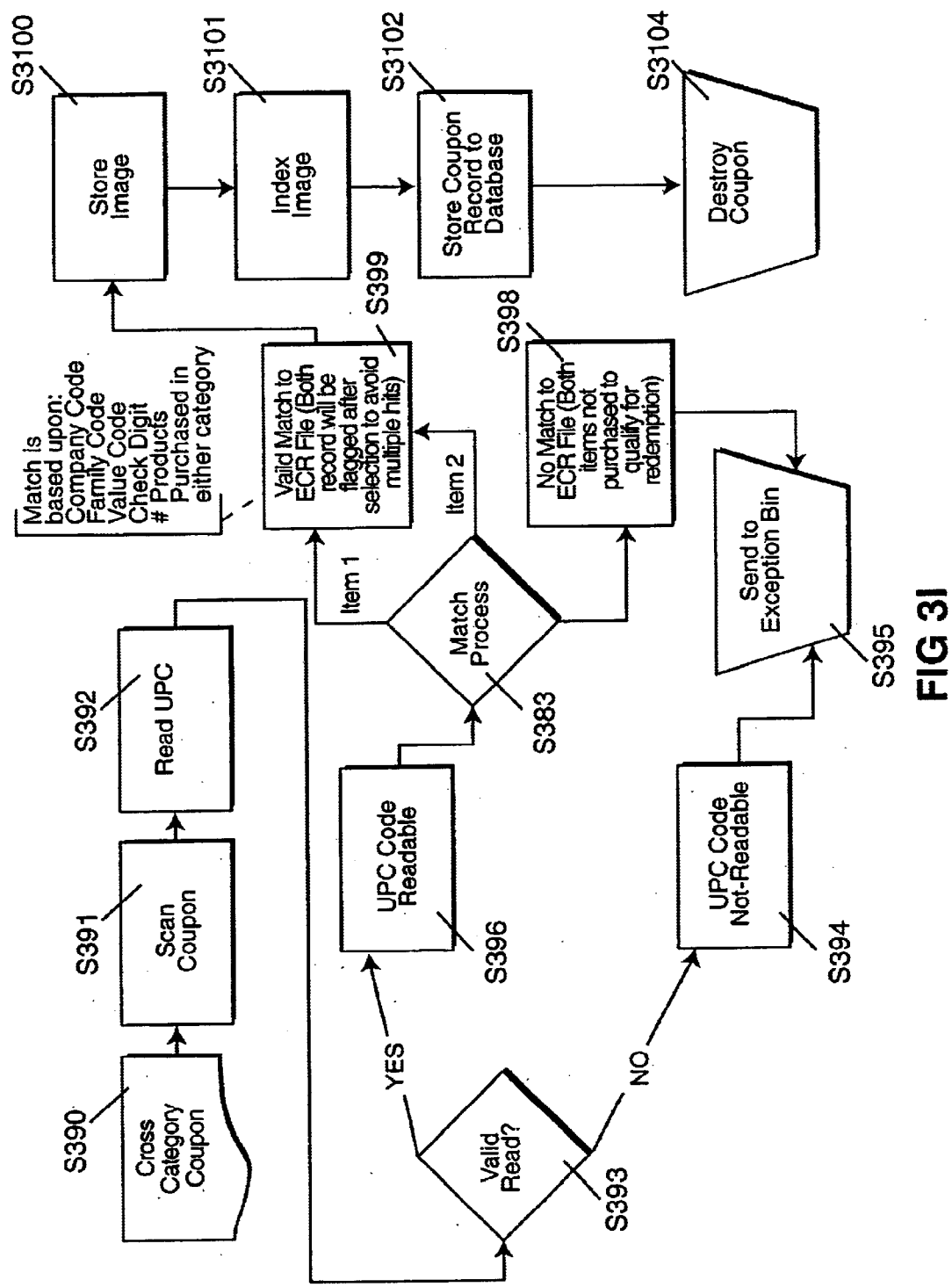

FIG. 3I sets forth the steps S390–S3103 for processing "cross-category" coupons which is similar to processing of the normal coupon in FIG. 3A except that in step S397 the processor determines whether the coupon applies to the category of the item to be purchased. A cross-category coupon entitles the consumer to receive a discount for goods in different categories, such as groceries, appliances, clothing, electronics or the like. The categories may also be groups such as food groups, appliance groups, clothing groups or electronics groups or the like. The processing stores the categories within which the consumer is entitled to a discount.

The booklet of the present invention may be utilized with the coupon manager system 100 described with reference to FIGS. 1–3. However, the booklet of the present invention is not limited and, alternatively, may be utilized with other systems such as those shown in FIGS. 4A and 4B.

Figure 4A:
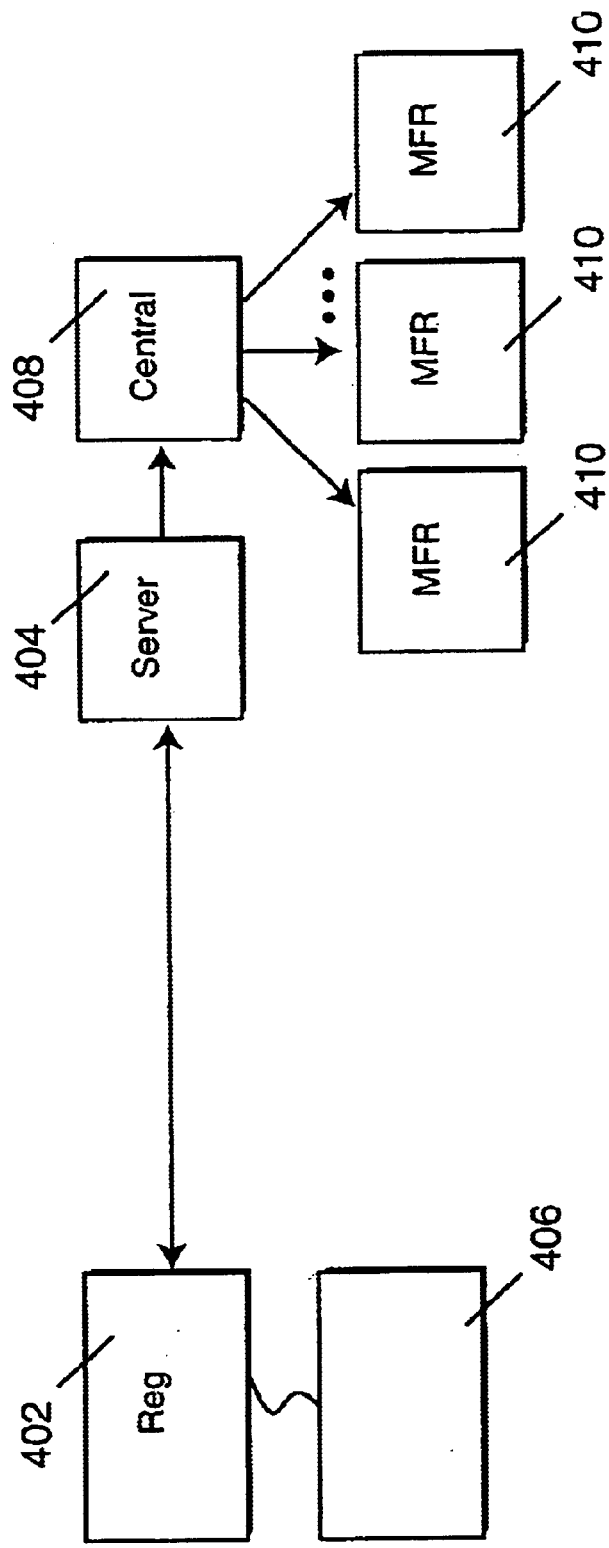
FIGS. 4A–4C are diagrams to which reference will be made in explaining drawings of the coupon manager system of FIG. 1.

FIG. 4A illustrates a non-integrated system 400. In such system, sales transactions may be scanned by scanner 406 at cash register 402 and transferred and recorded to store server 404. Such arrangement may be easily incorporated into an existing store. The system of FIG. 4A includes a central processing computer 408 which is coupled to the store server 404 by any suitable means including wired or wireless communication.

In operation, the central processing computer 408 stores predetermined information relating to discounts in the store server 404. As items or goods are scanned using scanner 406, associated transactional information is forwarded to the store server 404. When the scanner 406 scans a discount coupon, recognized by the UPC code, the store server 404 accesses the information stored therein to determine whether the coupon is redeemable. In at least one embodiment, the coupon is a booklet of discounts with a single UPC code Such booklet is more fully described hereinafter.

Figure 4B:
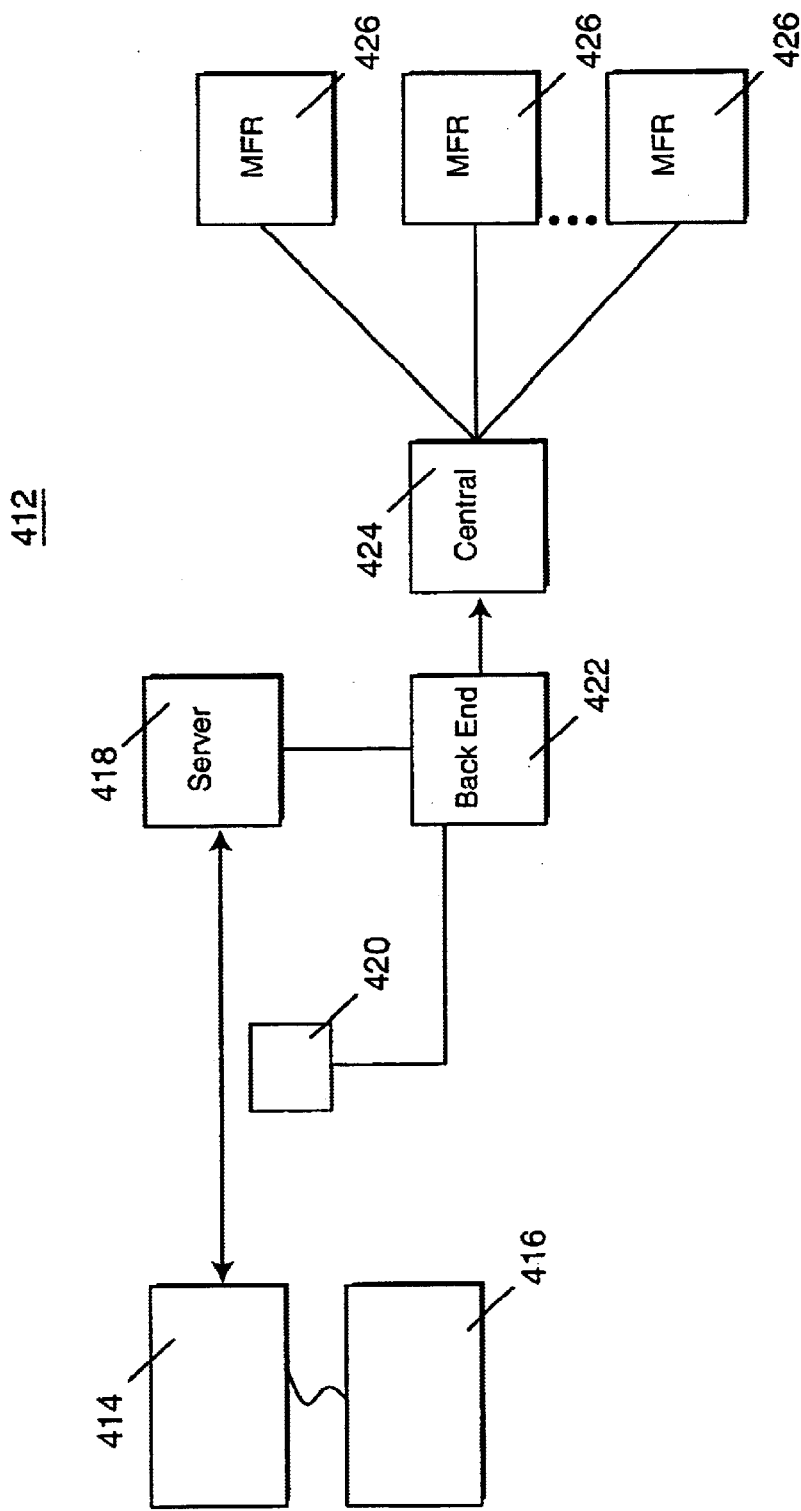
Figure 4C:
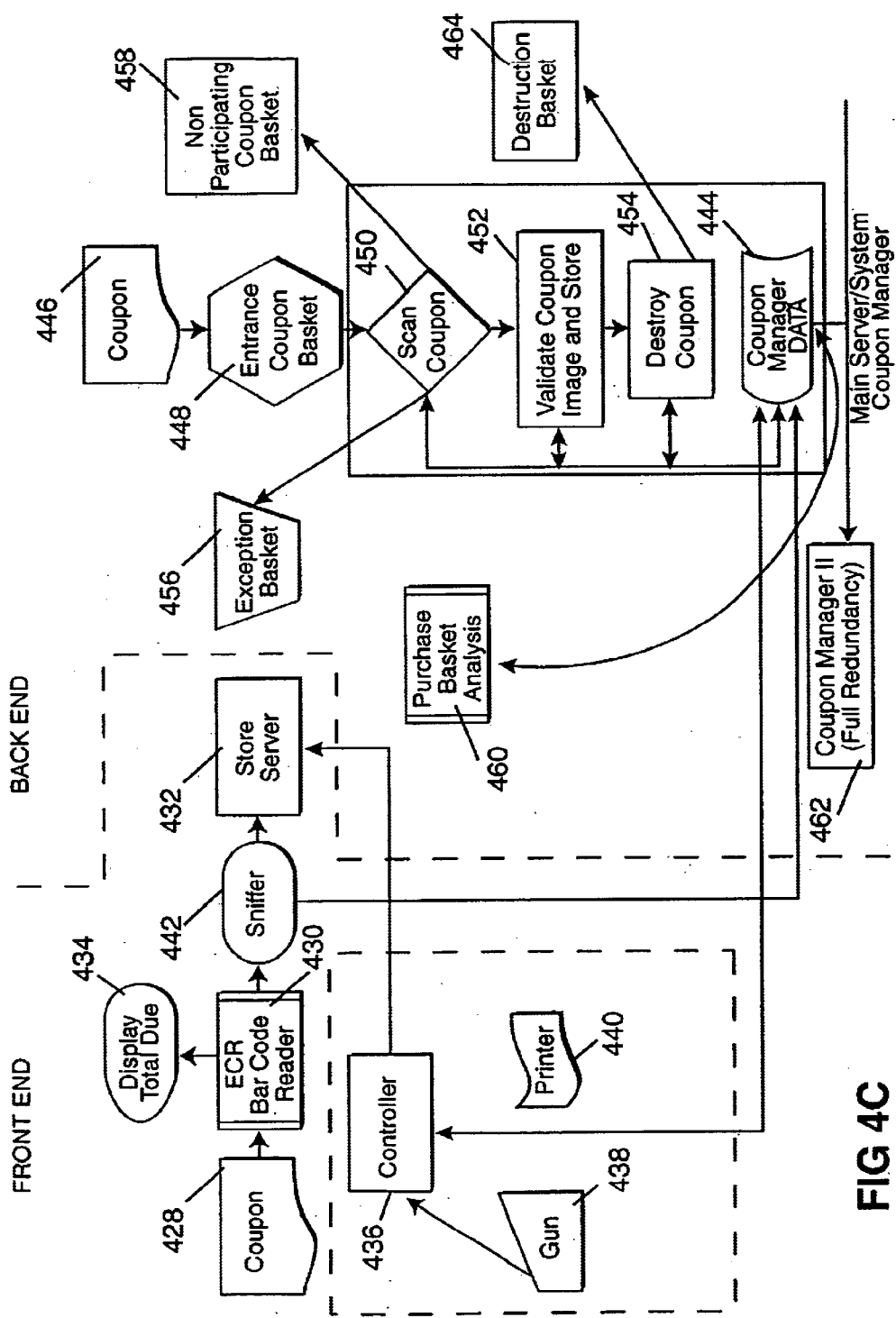

FIG. 4B shows an integrated system 412 of the present invention. Similar to the system of FIG. 4A, the integrated system includes a cash register 414 and a scanner 416 in communication with the store server 418. In this embodiment, a tap 420 (which may be a line tap) taps the communication between the cash register 414 or scanner 416 and the store server 418. Back end apparatus 422 determines whether the information received identifies the booklet of the present invention and/or discounts for items. The store server 418 determines the discount based on the discount information forwarded by the back end apparatus. The discounts are relayed to the cash register 414. The back-end apparatus 422 may be similar to the back end apparatus shown in FIG. 1 and may operate similarly. A central processing computer 424 is coupled to the back end apparatus 422 for processing the discount information. The central processing computer 424 may be similar to the central processing computer shown in FIG. 1 and may operate similarly. The processed discount information is forwarded to the respective manufacturers 426 for settlement. As in the embodiment of FIG. 1, various reports relating to the discount information may be forwarded to the manufacturers.

The discount information and the reports prepared by the central processing computer 424 may be available or supplied to the manufacturers by way of a website on the internet or on-line service. The discount information may include, for example, information corresponding to the total redemption value owed to a particular retailer and/or the break down of the discounts. The website, or as a stand-alone application, may enable electronic fund transfer capability which electronically transfers funds between the retailer, manufacturer and service corporation based on account balances generated by the processing. Processing of the booklet will now be further explained with reference to FIG. 4C.

Coupons or booklet 428 are scanned by ECR bar code reader 430. The scanned bar code information is supplied to store server 432. The store server 432, based on a comparison result to be explained, outputs to display 434 the discounted value of the items to be purchased. Alternatively, a gun 438 may be provided for scanning the bar code of the booklet 428 wherein a controller 436, based on a comparison to be explained, determines which products if any are to be discounted and forwards the information to the store server 432. A printer 440 may be provided to print information corresponding to the discount. A tap 442 (which may be a line tap) taps the communication between the reader 430 and the store server 432 to obtain transactional information and forwards the same to a buffer 444 for storage thereat.

The scanned coupons may be supplied to an input coupon basket 448. A scanner 450 scans the coupons and the processor validates the coupons at 452 based on the data stored in the buffer 444. Valid coupons are slated to be destroyed in 454 and forwarded to a destruction basket in 464. Similar to the embodiment of FIG. 1, an exception basket 456 and a nonparticipating basket 458 are provided. In addition, a purchase basket analysis processing is performed 460 based on the information in the buffer 444 which determines the purchases. A secondary back end apparatus 462 which repeats or simultaneously performs the processing hereindescribed may be provided for full redundancy.

Figure 6A:
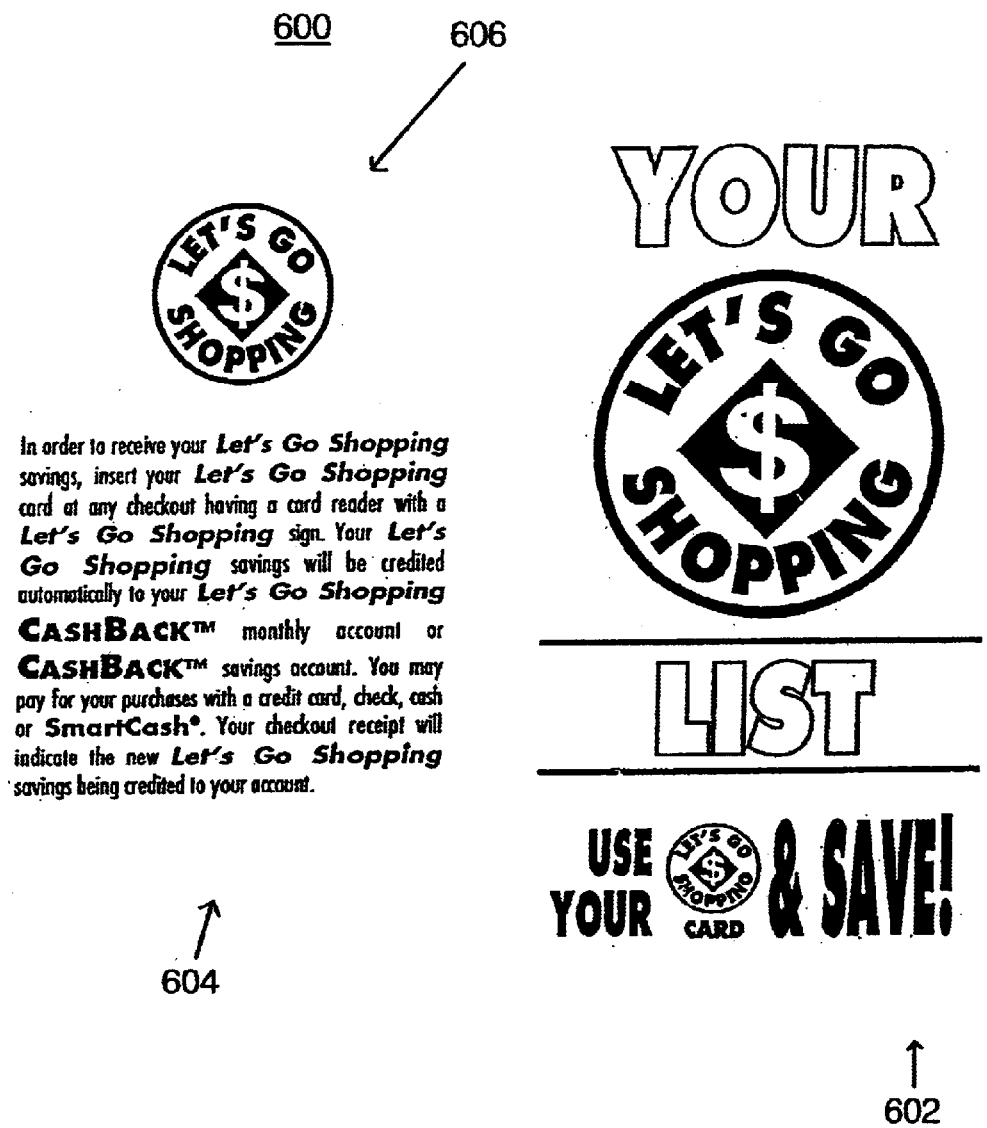
Figure 7A:
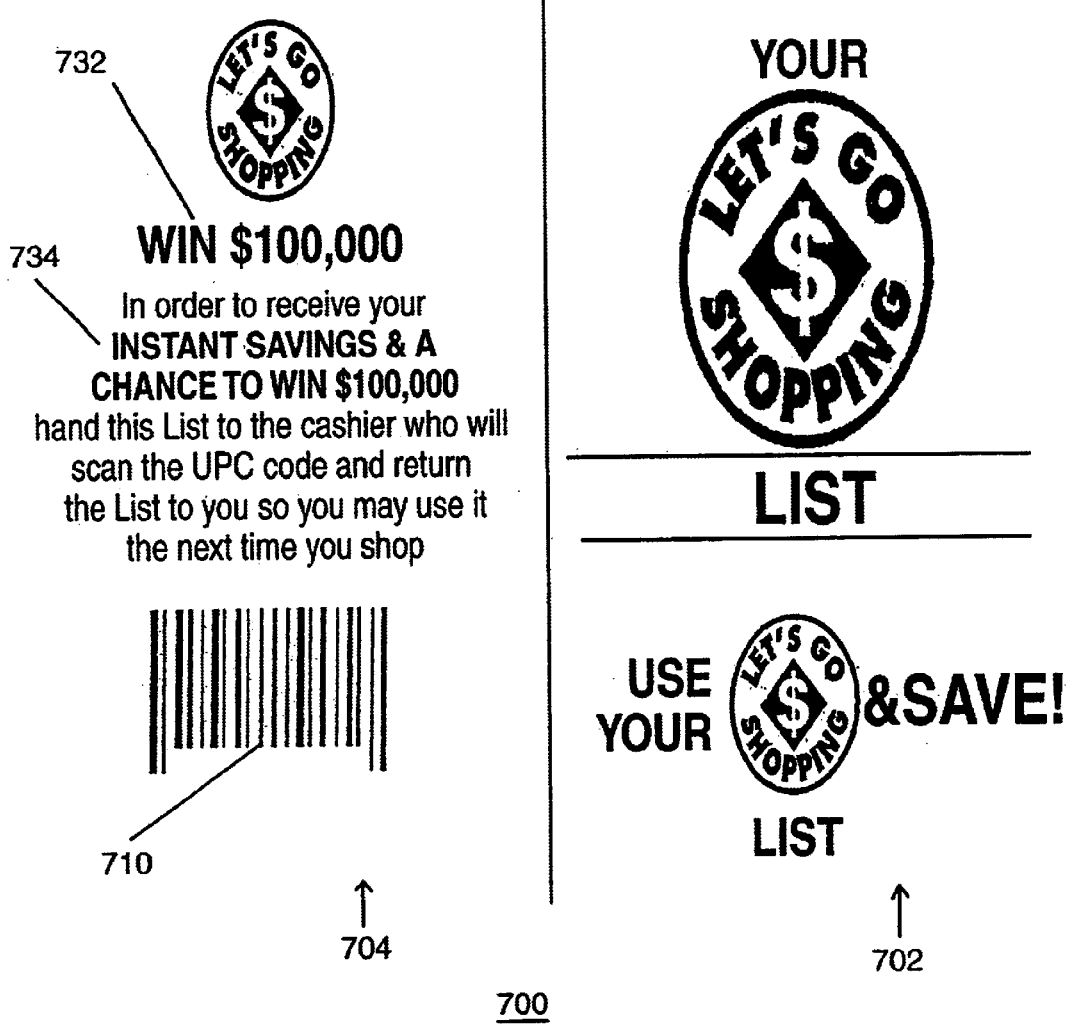
Figure 7B:

FIGS. 6 and 7 illustrate examples of the booklet 600(700) of the present invention. The coupon booklet 600(700) is envisioned for use by a potential customer to receive discounts for corresponding items in the booklet purchased at any number of stores. The booklet comprises a front cover 602(702) and a back cover 604(704) which share a common edge 606(706). In addition to the front and back covers, the booklet may contain a number of in-between pages such as those shown in FIGS. 6B–F and 7B–F which are coupled to the common edge. As shown in FIG. 6B for example, the booklet includes a listing 608(708) of a plurality of items and prices associated therewith which may present discounts. The listing may also be on the front and back covers or the inside flap thereof. As shown in FIG. 7A, the booklet may include as shown in FIG. 7A, a single bar code 710 for identifying the plurality of items 712 to which the consumer is entitled to discount(s) 614(714) when scanned in a sales transaction. In at least one embodiment, the front and back covers and the in-between pages are coupled together so that the front and back cover and in-between pages are pivotable about the common edge in a book-like manner from an open position to a closed position. It will be appreciated that the single bar code of the booklet of the present invention may be replaced with another form of identification such as a serial number or the like.

A booklet may be considered a small scale edition of a book. Although the booklet may be of any size, as illustrated in FIGS. 6 and 7, the booklet may have the dimensions of 3½×6 inches which is found to be a convenient size which is small enough to be carried but large enough not to be misplaced as well as identifiable in a container such as a pocket or hand bag. The booklet may be a collection of sheets fastened together along one edge. The book or booklet may be trimmed at the other edges to form a single series of uniform leaves. In the alternative, the booklet may be a collection of folded sheets bound between covers into a volume. In addition, the booklet may be a stack of sheets of paper interleaved alternately with the material.

The listing of items in the booklet may be formed in an index or table-of-contents form such that the items are organized according to a predetermined manner such as alphabetical order, food groups, discount prices, manufacturer or the like. The index or table-of-contents may be arranged according to the type of product such as groceries, appliances, cameras, clothing, cookware, electronics, footwear, furniture, jewelry, watches, outerwear or the like. Sub-headings may be provided, for example, for each group which are arranged according to a manufacturer, product-line or the like. The index or table-of-contents may be segregated by lateral dividing lines 616(716) shown in FIGS. 6B and 7C, for example, which segregate the different indices or contents according to, for example, category. The lateral dividing lines may be variably-spaced such that an area between adjacent lateral lines is variable.

It is also within the present invention to arrange the items for discount according to combinations of items which the retailer and/or manufacturer wish to combine for sale such as baby food and diapers or peaches and cream. Sometimes it is desired to combine in the booklet undersold items with popular items such as combining pork rinds which are undersold with more popular products such as bacon.

It is within the scope of the present invention to arrange the items for discount with prominent headings 618(718). In at least one embodiment, the headings are prominently displayed in a larger font-size 620(720) than the products 622(722) and/or arranged prior to the respective products. It will be appreciated that this feature of the present invention advantageously allows the potential customer to more quickly identify the goods.

It is also within the present invention to color-code the booklet. For example, the prominent headings may be color-coded with different colors, such as green 624(724) for groceries, blue 626 for electronics, silver 728 for appliances and multi-colors 730 for film and camera products. Although it is shown in the figures that the headings are color coded, portions or entire areas corresponding to, for example, different categories of goods may be color coded. It will be appreciated that color-coding advantageously assists the consumer to quickly locate desired discounts.

The booklet of the present invention may also provide a miniature picture 732 positioned proximate or adjacent the item entitled to the discount. In at least one embodiment, the miniature picture is a miniature of an actual photograph of the product. It will be instantly recognized that the use of such miniature pictures is extremely useful to the consumer in identifying the product. Combined with the index or table-of-contents, the potential consumer quickly determines from the index or table-of-contents the discount information and instantly is made aware and confirms by visually inspecting the miniature picture the product to be purchased.

In addition, or in the alternative, the booklet of the present invention includes additional advertisements and/or information. This may include sweepstakes information or instant savings information 734 which awards the consumer with a prize such as cash or credit or a trip in exchange for particular uses of the booklet in order to entice the consumers to use the booklet. The information may also include coupons 736 prominently displayed in noticeable portions of the booklet such as the inner front page in order to highlight the discount which may be listed in the index or table-of-contents.

The booklet of the present invention includes a single bar code which entitles the consumer to a plurality of the discounts in the booklet. It will be instantly appreciated that this advantageously allows the consumer to carry a single, convenient and compact book representative of a plurality of coupons without the necessity or hassle of carrying detachable or detached coupons. It will further be appreciated that the book arrangement allows the consumer to easily hold the booklet along the common edge in the palm of one hand while flipping through the pages quickly and conveniently as a book rather than detached coupons. In at least one embodiment, the booklet is self-contained and has no detachable parts such that the consumer advantageously maintains all of the information in a neat, compact booklet without the problems of messy, detachable or detached coupons or information.

In addition, the consumer may not need to examine the booklet at all; and may simply submit the booklet upon each shopping transaction for scanning to obtain the discounts which coincidentally are in the booklet. Further, the consumer may use the booklet a number of times which obviates the need for coupon hunting and clipping. The products in the booklet may be discounted once or a plurality of times according to records maintained by the back end apparatus of the present invention.

The bar code may be a UPC code but, alternatively, may be another type of code such as an extended code which contains manufacturer, value or family information. This is particularly advantageous in marketing where the booklets may be mailed to a particular family with a unique family code which identifies for the retailer/manufacturer which family is purchasing a particular product or products. This information may be processed by the present invention and relayed to the manufacturer in the form of a demographics marketing report for future marketing to either the family or region where the family lives.

The booklet of the present invention in at least one embodiment is substantially rectangular in shape having front and back covers with a common edge and pages therebetween. The common edge may be formed of a spine or a folded line of a number of papers. Alternatively, the front and back covers and in-between pages may be coupled together by any suitable fixing method such as staples, glue or a spiral binder or the like. While the booklet of the present invention is shown in FIGS. 6 and 7 as being substantially rectangular with uniform edges, it is within the present invention that the booklet may be in another shape and/or may have non-uniform edges. The booklet of the present invention may include tabs on the pages which may be labeled with an indicator thereby providing an index.

The booklet of the present invention may provide discounts or discounted prices for items purchased. In addition, or in the alternative, the items purchased using the booklet may provide the consumer with other entitlements, including the coupon entitlements described herein with reference to FIGS. 3A-4C. In addition, or in the alternative, the entitlements may be a credit granted to the consumer which may credit an account held electronically for the consumer. A credit may be different from a coupon discount because a credit is applied to a future transaction not necessarily related to the present transaction. Such credit accounts may be, for example, a vacation account which accumulates credit for the consumer for cash value or items purchased at a later date for the consumer's vacation. The account may also be a holiday or birthday account for saving credit for cash value or to be applied to items purchased for a holiday or birthday. The account may be a tuition savings account whereby credits are applied to the tuition of the consumer or relative of the consumer. The credit account may be an account for cash value including an interest bearing account which accumulates interest such as a money market account. It will be appreciated that the credit accounts of the present invention advantageously promotes loyalty of the consumer to the retailer, manufacturer or service corporation.

The system of the present invention may include the manner in which the booklet is distributed and used. In at least one embodiment, the booklet is issued for predetermined time periods such as monthly in ride-along direct mail pieces to consumers. Participating stores which participate in the system may have a list of offers downloaded to either the store server or the back end processor described herein. When the consumer checks out, the booklet is handed to the cashier who scans the single bar code on the booklet. It will be instantly appreciated that this advantageously allows the consumer to obtain any discounts which may be available without the consumer having to find the discount. The system of the present invention may automatically transfer the information and/or the electronic fund transfer at predetermined intervals such as nightly. At the end of the predetermined time period, a new booklet is distributed and the previous information is either automatically deleted or replaced by new information. It may be also within the processing of the present invention to establish payment of the booklets, the distribution and/or number of items in the booklet. It is also within the present invention to establish a partnership with a bank or other financial institution to establish savings accounts for consumers from and through direct deposit of the savings the consumer receives by utilizing the booklet in accordance with the credit aspect of the present invention.

Figure 7G:
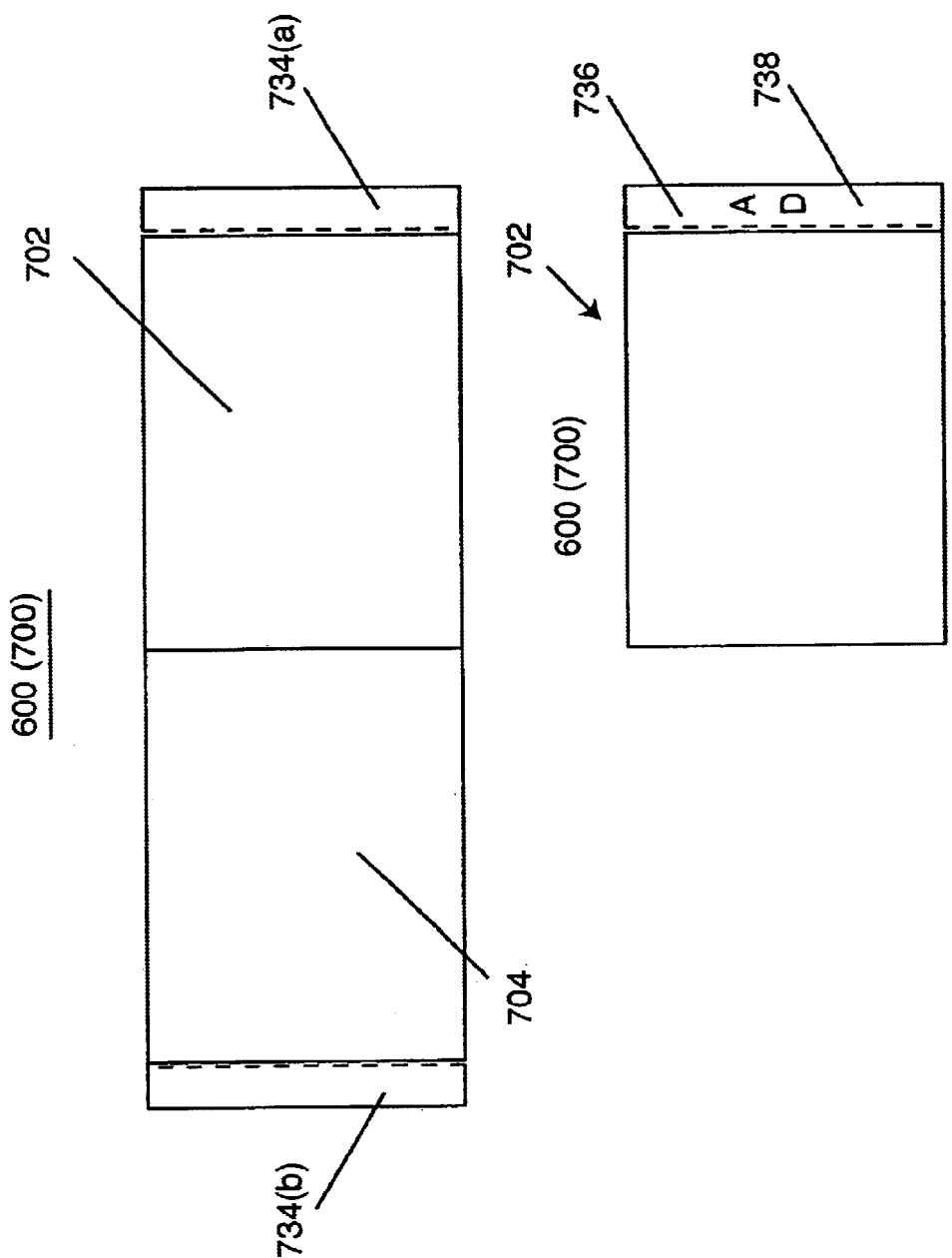

The booklet may also include, as shown in FIG. 7G, extended front 702 and back covers 704 which extend past the pages encloseable therebetween. In one embodiment, the extended portion is a tab or opposing tabs 734 (a) and 734(*b*) formed which may be detachable along a perforated edge 736. An advertisement 738, which may include a coupon, may be provided on the tab. It will be appreciated that the tab easily distinguishes the booklet of the present invention from junk mail.

Figure 5A:
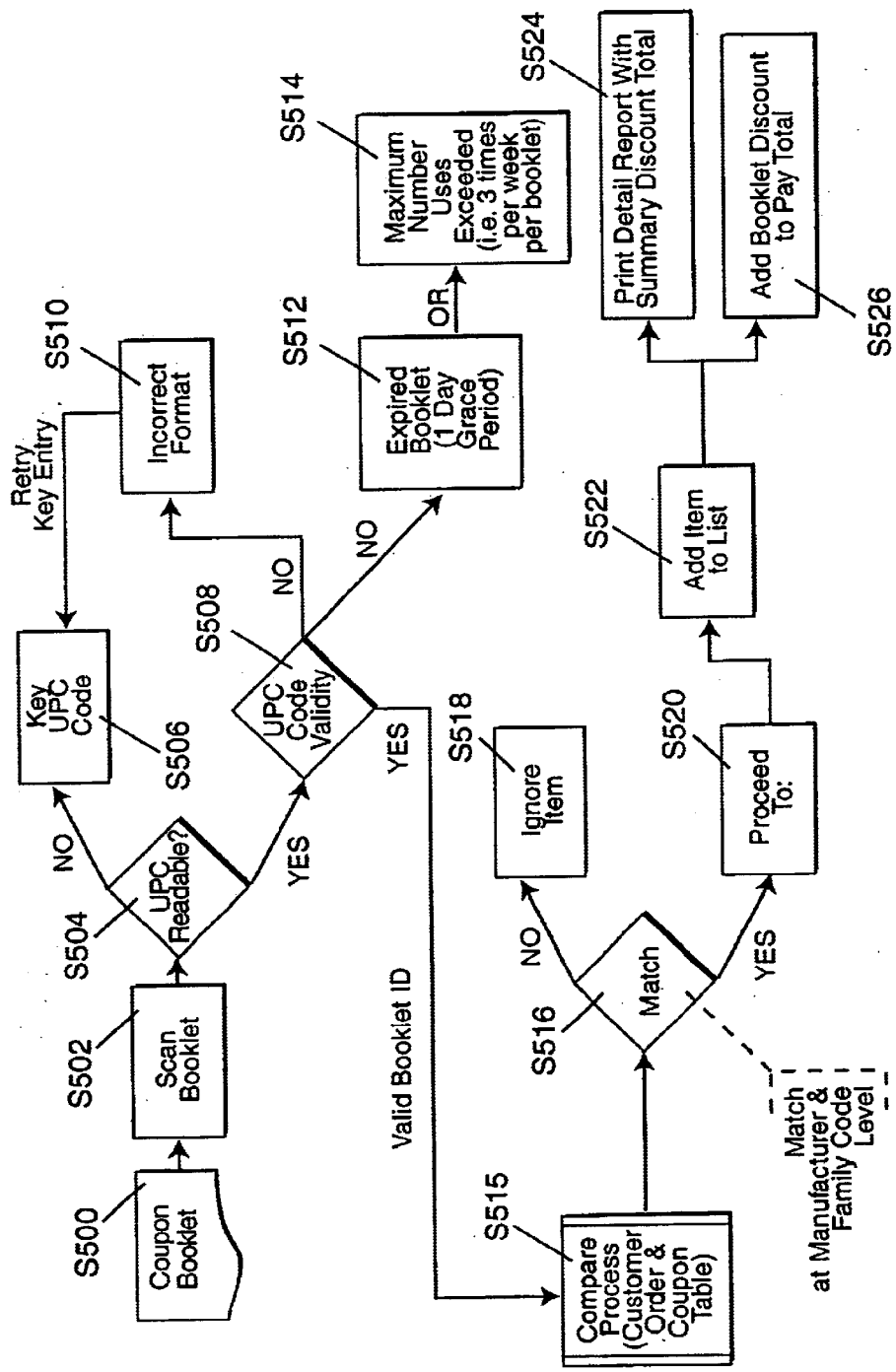
FIGS. 5A and B are diagrams of the system for processing the booklet of the present invention.

The processing steps for the integrated coupon booklet are shown in FIG. 5A. In step S500, the coupon booklet is presented and in step S502 the booklet is scanned. In step S504 it is determined whether the bar code, such as a UPC, is readable and in step S506 the operator manually keys in the booklet bar code when unreadable. In step S508, it is determined whether the bar code is valid and, when invalid, it is determined that an incorrect format of the bar code is scanned in step S510 and manual entry of the bar code by, for example, a keypad is retried in step S506. In the alternative, when it is determined that the bar code is invalid it is further decided that, for example, an expired booklet is granted a grace period such as one day or week in step S512 and/or the maximum number of uses of the booklet is extended in step S514. The results of the processing in steps S512 and S514 are recorded and may be reported in the report(s).

When it is determined that the bar code is valid, processing in step S514 compares a customer order to a coupon table which may contain one or more pieces of discounting information relating to a discount, credit or rebate relating to a particular item. The table may be downloaded/updated by the central processing computer of the present invention. When no match is determined in step S516 between a particular sales transaction and coupon information, the discount for that item is ignored in step S518. Otherwise, control advances to step S520 wherein the discount is authorized. In step S522, the item authorized for a discount is added to a list. In step S524, detailed and/or summary reports of the discounts are stored and/or printed and in step S526 the booklet discount is added to a total to be forwarded to a particular manufacturer for redemption.

Figure 5B:
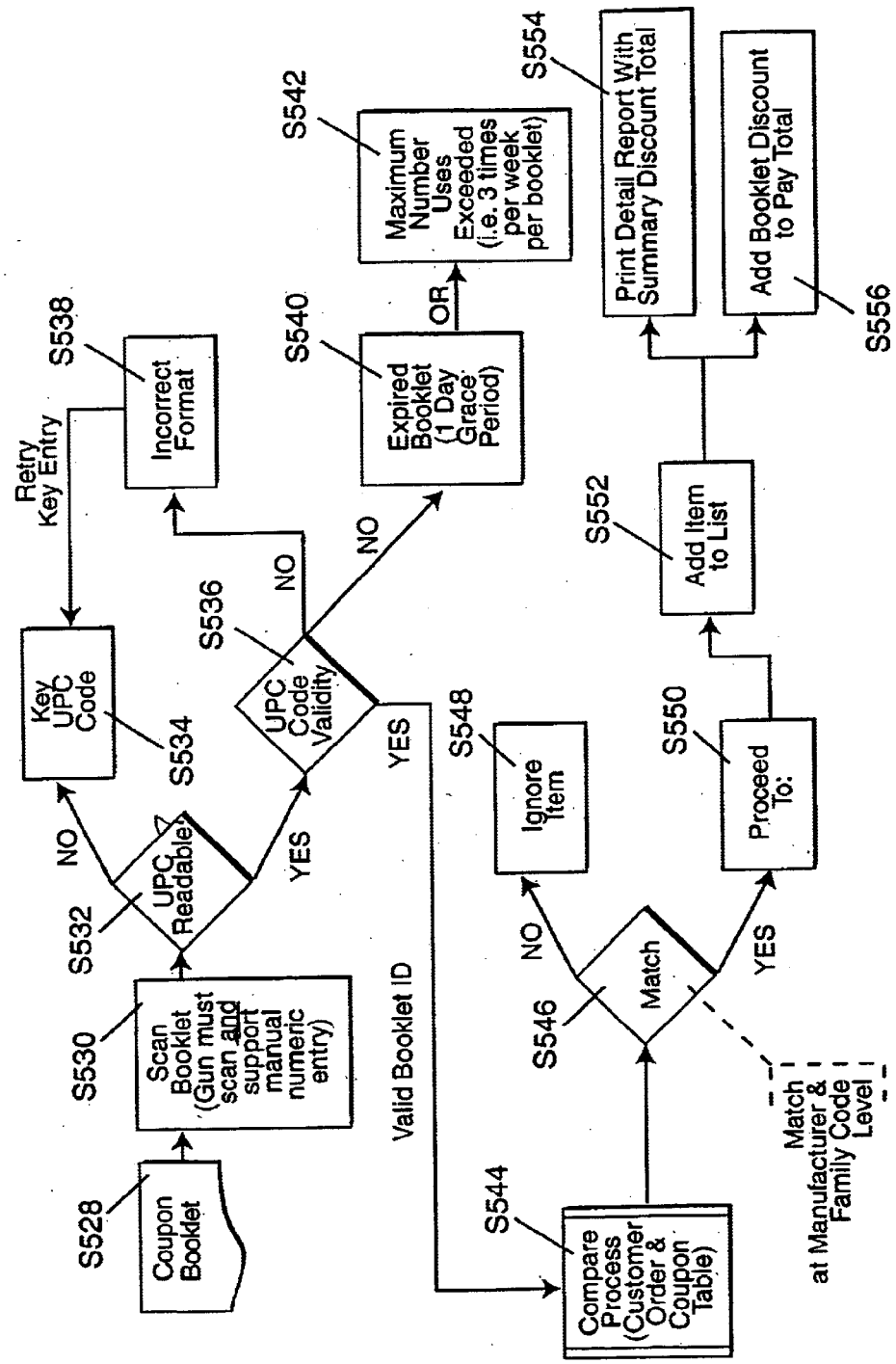

FIG. 5B sets forth steps S528–S556 for processing coupons or booklet (see FIG. 5B) according to the non-integrated system which are similar to the steps set forth in FIG. 5A.

The present coupon processing may be set forth in a computer program which may be stored in a suitable medium such as an optical disk or the like.

As is to be appreciated, finding, cutting out, and carrying a large number of coupons may be inconvenient for a customer. The present invention provides a booklet which overcomes these disadvantages. Such present booklet has been described hereinabove.

It will be appreciated that, while the present invention was described in terms of coupon redemption, the present is not limited thereto and is applicable to other forms of redemption such as rebates or credit accounts.

Although the booklet present invention has been described with a single bar code only for each booklet, it is within the present invention to include one or more bar codes each representing a plurality of items in the booklet.

Although preferred embodiments of the present invention and modifications thereof have been described in detail herein, it is to be understood that this invention is not limited to those precise embodiments and modifications, and that other modifications and variations may be effected by one skilled in the art without departing from the spirit and scope of the invention as defined by the appended claims.

What is claimed is:

1. A processing apparatus for processing coupons collected by a retailer at a point of sale corresponding to discounted items, said apparatus comprising:

means for receiving a number of coupons that were collected at said point of sale during previous transactions, in which each coupon has a bar code and corresponds to a discounted item and has two sides;

means for imaging at least one side of each received coupon so as to capture an image and form imaged data representing the captured image, said imaged data including imaged bar code data corresponding to the respective bar code; and means for electronically processing said imaged data representing the captured image in a predetermined manner, said processing including reading the bar code of a received coupon based on the imaged bar code data for that coupon and at least one of: matching the read bar code of the received coupon to a bar code scanned in a previous transaction involving the received coupon that occurred at the point of sale; and, arbitrarily assigning the received coupon corresponding to the read bar code to a previous transaction involving a bar code scanned coupon based on transaction type; and said electronic processing of said imaged data further including running a fraud security program that performs comparisons of coupon cuts in the captured images to look for gang cuts, to thereby identify fraudulent coupon redemption.

2. The processing apparatus according to claim 1, wherein said means for imaging images both sides of said coupon.

3. The processing apparatus according to claim 2, wherein one of said sides indicates information relating to said discounted item and the other side of said coupon indicates information of a holder of said coupon.

4. The processing apparatus according to claim 1, wherein said means for imaging is an image scanner which captures an image of said coupon.

5. The processing apparatus according to claim 1, further comprising a memory for storing data representing a number of images of said coupons imaged by said means for imaging.

6. The processing apparatus according to claim 5, wherein said memory stores a portion of the total number of the imaged coupons.

7. The processing apparatus according to claim 5, wherein said memory stores a truncated portion of a respective imaged coupon.

8. The processing apparatus according to claim 7, wherein said truncated portion is an image of a bar code.

9. The processing apparatus according to claim 1, wherein said predetermined manner involves determining which coupons are redeemable.

10. The processing apparatus according to claim 9, further comprising means for destroying coupons which are determined to be redeemable by the processing means.

11. The processing apparatus according to claim 10, wherein said means for destroying sprays the redeemable coupons with a liquid.

12. The processing apparatus according to claim 10, wherein said means for destroying imparts a physical abrasion on the redeemable coupons.

13. The processing apparatus according to claim 10, wherein said means for destroying burns on the redeemable coupons by directing a laser thereon.

14. The processing apparatus according to claim 10, wherein said means for destroying includes spokes which are pivotable about an axis; wherein perforations are formed in said coupon as said spokes pivot.

15. The processing apparatus according to claim 9, wherein the predetermined manner involves digitally analyzing the imaged data to determine which of said coupons are redeemable.

16. The processing apparatus according to claim 9, wherein said predetermined processing involves arbitrarily assigning each redeemable coupon to a discounted item discounted at said point of sale.

17. The processing apparatus according to claim 10, further comprising a bin for receiving destroyed coupons.

18. The processing apparatus according to claim 1, further comprising a discard bin for receiving coupons which are processed in accordance with another predetermined manner.

19. The processing apparatus according to claim 1, further comprising a non-participating bin and wherein the processing means determines if a respective coupon is associated with a non-participating entity and supplies the respective coupon to said non-participating bin upon determining that the respective coupon is associated with the nonparticipating entity.

20. The processing apparatus according to claim 1, further comprising a bin and wherein the processing means determines if a respective coupon is a local coupon redeemed by said retailer and supplies the respective coupon to said bin upon determining that the respective coupon is said local coupon.

21. The processing apparatus according to claim 1, further comprising a bin for receiving coupons for other applications as determined by the means for processing.

22. The processing apparatus according to claim 1, further comprising a bin for receiving coupons which cannot be imaged by said means for imaging as determined by the means for processing.

23. A system for processing coupons received at a plurality of stores, said system comprising:

front end means at a point of sale in each stare whereat a number of coupons corresponding to a number of discounted items are collected;

back end means in each store at a distant location from said point of sale for physically handling and electronically processing, in a predetermined planner, coupons that were collected by said front end means at said point of sale during prior transactions, said processing including imaging at least one side of received coupons so as to form imaged data representing the captured image of each coupon, and running a fraud security program that performs comparisons of coupon cuts in the captured images to look for gang cuts, to thereby identify fraudulent coupon redemption; and central processing means remotely coupled to each store for receiving information indicative of a result of said processing by said back end means.

24. The system according to claim 23, wherein said front end means includes a plurality of cash registers.

25. The system according to claim 23, wherein said central processing means includes means for supplying information indicating redemption of a respective number of said coupons to a manufacturer associated therewith.

26. The system according to claim 25, wherein said central processing means includes a central computer.

27. The system according to claim 25, wherein the supplying means supplies the redemption information by way of an internet.

28. The system according to claim 23, wherein said back end means includes means for imaging said coupons collected at said point of sale.

29. The system according to claim 28, wherein a collected coupon has a front side and a back side and wherein said means for imaging images the front and back sides of said collected coupon.

30. The system according to claim 29, wherein one of said front and back sides indicates information relating to the respective discounted item and the other of said front and back sides indicates information of a consumer who presents said collected coupon.

31. The system according to claim 29, wherein said means for imaging is an image scanner which captures an image of said collected coupon.

32. The system according to claim 29, further comprising a memory for storing data representing a number of images of said coupons imaged by said means for imaging.

33. The system according to claim 32, wherein said memory stores a portion of a total number of the imaged coupons.

34. The system according to claim 32, wherein said memory stores a truncated portion of a respective imaged coupon.

35. The system according to claim 34, wherein said truncated portion is an image of a bar code.

36. The system according to claim 23, wherein said predetermined manner involves determining which coupons are redeemable.

37. The system according to claim 23, wherein said back end means comprises means for destroying coupons which are determined to be readable by the processing means.

38. The system according to claim 37, wherein said means for destroying sprays the redeemable coupons with a liquid.

39. The system according to claim 37, wherein said means for destroying imparts a physical abrasion on the redeemable coupons.

40. The system according to claim 37, wherein said means for destroying burns on the redeemable coupons by directing a laser.

41. The processing apparatus according to claim 37, wherein said means for destroying includes spokes which are pivotable about an axis; wherein perforations are formed in said coupon as said spokes pivot.

42. The system according to claim 37, wherein the predetermined manner involves digitally analyzing the imaged data to determine which of said coupons are redeemable.

43. The system according to claim 42, wherein a received coupon includes a bar code indicating information relating to redemption.

44. The system according to claim 43, wherein said predetermined manner involves digitally analyzing said bar code.

45. The system according to claim 36, wherein said predetermined processing involves arbitrarily assigning each redeemable coupon to a discounted item discounted at said point of sale.

46. The system according to claim 23, wherein said back end means further comprises a bin for receiving destroyed coupons.

47. The system according to claim 23, wherein said back end means further comprises a discard bin for receiving coupons which are processed in accordance with another predetermined manner.

48. The system according to claim 36, wherein said back end means further comprises a non-participating bin and wherein the processing means determines if a respective coupon is associated with a non-participating entity and supplies he respective coupon to said non-participating bin determining the respective coupon is associated with the non-participating entity.

49. The system according to claim 36, wherein said back end means further comprises a bin and wherein the processing means determines if a respective coupon is a local coupon redeemed by said retailer and supplies he respective coupon to said bin upon determining that the respective coupon is said local coupon.

50. The system according to claim 23, wherein said back end means further comprises a bin for receiving coupons for other applications as determined by the back end means.

51. The system according to claim 29, wherein said back end means further comprises a bin for receiving coupons which cannot be imaged by said means for imaging as determined by the back end means.

52. The processing apparatus according to claim 1, further comprising:
   an exception bin; and
   means for forwarding a received coupon to the exception bin when it is determined that the received coupon does not match a previous transaction.

53. The system according to claim 23, wherein said back end means includes:
   means for receiving a number of coupons that were collected by said front end means at said point of sale during previous transactions;
   means for imaging each received coupon so as to form imaged data; and
   said processing includes at least one of: matching the received coupon corresponding to the imaged data to a previous transaction involving the received coupon that occurred at the point of sale; and, arbitrarily assigning the received coupon corresponding to the imaged data to a previous transaction involving a coupon based on transaction type.

54. A processing apparatus for processing coupons collected by a retailer at a point of sale corresponding to discounted items, said apparatus comprising:
   means for receiving a plurality of coupons, in which each coupon corresponds to a discounted item and has two sides with a bar code on at least one side;
   means for imaging at least one side of each received coupon so as to capture an image and form imaged data representing the captured image, said imaged data including imaged bar code data corresponding to the respective bar code; and
   means for processing said imaged data in a predetermined manner, said processing including reading the bar code of a received coupon based on said imaged bar code data for that coupon, and running a fraud security program that performs comparisons of coupon cuts in the captured images to look for gang cuts, to thereby identify fraudulent coupon redemption.

55. A processing method for processing coupons collected by a retailer at a point of sale corresponding to discounted items, said method comprising:
   receiving a plurality of coupons, in which each coupon corresponds to a discounted item and has two sides with a bar code on at least one side;
   imaging at least one side of each received coupon so as to capture an image and form imaged data representing the captured image, said imaged data including imaged bar code data corresponding to the respective bar code; and
   processing said imaged data in a predetermined manner, said processing including reading the bar code of a received coupon based on said imaged bar code data for that coupon, and running a fraud security program that performs comparisons of coupon cuts in the captured images to look for gang cuts, to thereby identify fraudulent coupon redemption.

56. The processing apparatus of claim 54 wherein said processing is performed by a program to perform said comparing coupon cuts to identify gang cuts, and further to tabulate unlikely mixes of coupons.

57. The processing apparatus of claim 54 wherein said processing is performed by a program to perform said comparing coupon cuts to identify gang cuts, and further to tabulate unlikely redemption rates by a cashier or store.

58. The processing apparatus of claim 54 wherein all bar code reading is performed digitally via said imaging by said apparatus without the use of a bar code scanner.

* * * * *